US012337243B2

(12) United States Patent
Konishi et al.

(10) Patent No.: US 12,337,243 B2
(45) Date of Patent: Jun. 24, 2025

(54) INFORMATION STORAGE MEDIUM, INFORMATION PROCESSING DEVICE, AND METHOD FOR CONTROLLING INFORMATION PROCESSING DEVICE

(71) Applicant: CYGAMES, INC., Tokyo (JP)

(72) Inventors: Wataru Konishi, Tokyo (JP); Takashi Fujita, Tokyo (JP)

(73) Assignee: CYGAMES, INC., Tokyo (JP)

( * ) Notice: Subject to any disclaimer, the term of this patent is extended or adjusted under 35 U.S.C. 154(b) by 399 days.

(21) Appl. No.: 17/808,757

(22) Filed: Jun. 24, 2022

(65) Prior Publication Data

US 2022/0314127 A1    Oct. 6, 2022

Related U.S. Application Data

(63) Continuation of application No. PCT/JP2020/047110, filed on Dec. 17, 2020.

(30) Foreign Application Priority Data

Dec. 26, 2019    (JP) .................. 2019-236098

(51) Int. Cl.
A63F 13/795        (2014.01)
A63F 13/86         (2014.01)

(52) U.S. Cl.
CPC ............ *A63F 13/795* (2014.09); *A63F 13/86* (2014.09)

(58) Field of Classification Search
CPC ......... A63F 13/795; A63F 13/86; A63F 13/35
(Continued)

(56) References Cited

U.S. PATENT DOCUMENTS 9,474,979 B2 * 10/2016 Yamaguchi ........... A63F 13/825
2012/0264513 A1* 10/2012 Kaneyoshi ............ A63F 13/537
463/31

(Continued)

FOREIGN PATENT DOCUMENTS

JP       2007215767    *  8/2007 ........... A63F 13/795
JP       2019072245 A     5/2019
(Continued)

OTHER PUBLICATIONS

International Search Report issued in International Application No. PCT/JP2020/047110, mailed Feb. 9, 2021 (6 pages).
(Continued)

*Primary Examiner* — Michael A Cuff
(74) *Attorney, Agent, or Firm* — Osha Bergman Watanabe & Burton LLP

(57) ABSTRACT

Provided are a program, an information processing device, and a method for controlling the information processing device that are capable of improving an interface environment for a game in which players fight a battle against each other. Provided is a watching function that allows setting of a watching right concerning a battle between players belonging to a battle group in response to a request from the terminal of a player serving as an organizer and that allows the battle between the players to be watched according to the setting content about the watching right. A watching right setting unit can set a watching right with which a battle between players belonging to the battle group cannot be watched at a terminal of a player who is neither the organizer nor the players fighting the battle but can be watched through the terminal of the player registered as an organizer.

4 Claims, 25 Drawing Sheets

(58) Field of Classification Search
USPC .......................................................... 463/42
See application file for complete search history.

(56) References Cited

U.S. PATENT DOCUMENTS

| | | | |
|---|---|---|---|
| 2019/0192977 A1* | 6/2019 | Eatedali | A63F 13/35 |
| 2020/0078686 A1* | 3/2020 | Morishita | A63F 13/69 |
| 2021/0001231 A1* | 1/2021 | Kurabayashi | G06N 5/04 |

FOREIGN PATENT DOCUMENTS

| | | | | |
|---|---|---|---|---|
| WO | 2015022785 | * | 2/2015 | A63F 13/795 |
| WO | 2019026763 | * | 2/2019 | A63F 13/795 |

OTHER PUBLICATIONS

Written Opinion issued in International Application No. PCT/JP2020/047110; Dated Feb. 9, 2021 (3 pages).

* cited by examiner

FIG. 7

| GAME METHOD | B01、B03、B05 |
|---|---|
| FORMAT | ROTATION, UNLIMITED |
| START TIME | 1、2、3, 4, 8, 12, 24 (HOURS LATER) |
| COMPETITION HOLDING PERIOD | 1、2、3, 4, 8, 12, 24 (HOURS) |
| WATCH SETTING | ORGANIZER ONLY, ORGANIZER AND PARTICIPANTS, NO WATCHING |
| ORGANIZER PARTICIPATION | ON, OFF |

INFORMATION STORAGE MEDIUM, INFORMATION PROCESSING DEVICE, AND METHOD FOR CONTROLLING INFORMATION PROCESSING DEVICE

This application is a continuation of International Patent Application No. PCT/JP2020/047110, having an international filing date of Dec. 17, 2020, which designated the United States, the entirety of which is incorporated herein by reference. Japanese Patent Application No. 2019-236098 filed on Dec. 26, 2019 is also incorporated herein by reference in its entirety.

BACKGROUND

The present invention relates to a information storage medium, an information processing device, and a method for controlling an information processing device, for a game in which players fight a battle against each other.

Conventionally, there are well-known programs for executing games implementing a competition function that allows players to fight a battle against each other with a player serving as an organizer by using terminals connected to each other via a communication line. Some of these existing competition functions also implement a watching function that allows the progress of a battle between players to be watched on a terminal screen. However, such a watching function for player-organized competitions has been capable of doing no more than setting whether to enable or disable battle watching (refer to Japanese Unexamined Patent Application, Publication No. 2019-72245).

However, in the case where a watching function is implemented in a game, etc. in which players fight a battle against each other by using game media decorated with the motif of trading cards (a so-called TCG), participants becoming equally able to watch a battle may make it difficult to ensure fairness in the battle because there is a risk that the participants, who are people other than the players, will grasp the deck construction and the players' unique tactics. For this reason, there is a need for an interface environment that can provide an appropriate watching function.

SUMMARY

The present invention has been conceived in the light of the above-described circumstances, and an object thereof is to provide a program, an information processing device, and a method for controlling an information processing device that are capable of improving an interface environment for a game in which players fight a battle against each other.

According to a first aspect of the invention, there is provided a non-transitory computer-readable information storage medium storing a program for a game in which players fight a battle against each other, said program causing a computer to function as:

a group generation unit for generating, in response to a request from a terminal of a player serving as an organizer, a battle group in which said player is registered as an organizer;

a player registration unit for registering, in response to requests from terminals of a plurality of players different from the organizer, said plurality of players in the battle group;

a watching right setting unit for setting, in response to a request from the terminal of the player serving as an organizer, a watching right concerning a battle between players belonging to the battle group; and a watching function providing unit for providing a watching function that allows a battle between players to be watched according to the setting content about the watching right, wherein the watching right setting unit can set a watching right with which a battle between players belonging to the battle group cannot be watched at a terminal of a player who is neither the organizer nor the players fighting the battle but can be watched through the terminal of the player registered as an organizer.

According to a second aspect of the invention, there is provided an information processing device for a game in which players fight a battle against each other, comprising:

a group generation unit for generating, in response to a request from a terminal of a player serving as an organizer, a battle group in which said player is registered as an organizer;

a player registration unit for registering, in response to requests from terminals of a plurality of players different from the organizer, said plurality of players in the battle group;

a watching right setting unit for setting, in response to a request from the terminal of the player serving as an organizer, a watching right concerning a battle between players belonging to the battle group; and a watching function providing unit for providing a watching function that allows a battle between players to be watched according to setting content about the watching right, wherein the watching right setting unit can set a watching right with which a battle between players belonging to the battle group cannot be watched at a terminal of a player who is neither the organizer nor the players fighting the battle but can be watched through the terminal of the player registered as an organizer.

According to a third aspect of the invention, there is provided a method for controlling an information processing device for a game in which players fight a battle against each other, said method comprising:

a group generation step of generating, in response to a request from a terminal of a player serving as an organizer, a battle group in which said player is registered as an organizer;

a player registration step of registering, in response to requests from terminals of a plurality of players different from the organizer, said plurality of players in the battle group;

a watching right setting step of setting, in response to a request from the terminal of the player serving as an organizer, a watching right concerning a battle between players belonging to the battle group; and a watching function providing step of providing a watching function that allows a battle between players to be watched according to setting content about the watching right, wherein, in the watching right setting step, it is possible to set a watching right with which a battle between players belonging to the battle group cannot be watched at a terminal of a player who is neither the organizer nor the players fighting the battle but can be watched through the terminal of the player registered as an organizer.

BRIEF DESCRIPTION OF THE DRAWINGS

FIG. 7 is a diagram showing an example of items that can be set for competition information.

Figure 1:
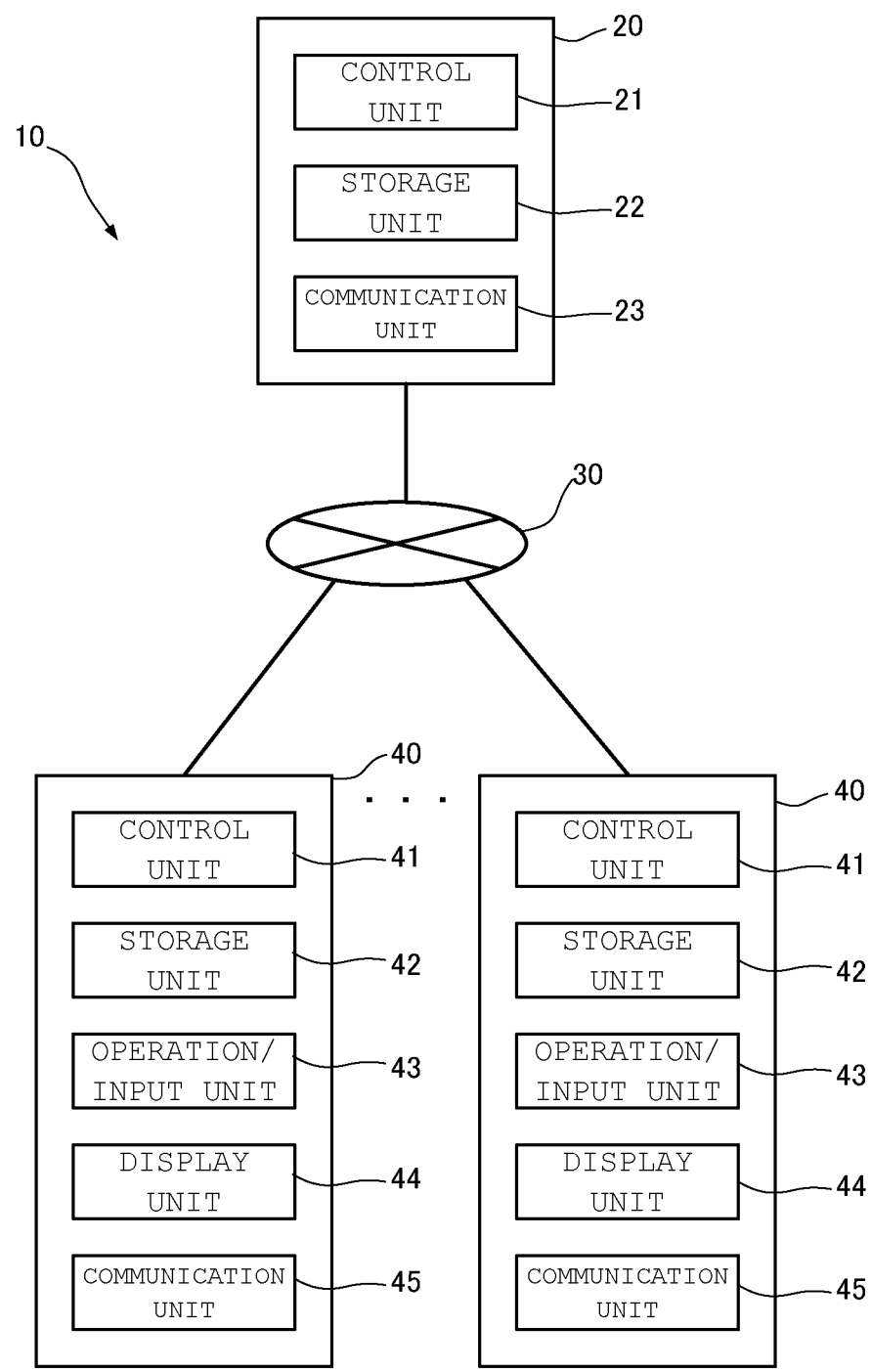
FIG. 1 is a diagram showing the overall configuration of an information processing system.

DESCRIPTION OF EXEMPLARY EMBODIMENTS (1) According to one embodiment of the invention, there is provided a non-transitory computer-readable information storage medium storing a program for a game in which players fight a battle against each other, said program causing a computer to function as: a group generation unit for generating, in response to a request from a terminal of a player serving as an organizer, a battle group in which said player is registered as an organizer; a player registration unit for registering, in response to requests from terminals of a plurality of players different from the organizer, said plurality of players in the battle group; a watching right setting unit for setting, in response to a request from the terminal of the player serving as an organizer, a watching right concerning a battle between players belonging to the battle group; and a watching function providing unit for providing a watching function that allows a battle between players to be watched according to setting content about the watching right, wherein the watching right setting unit can set a watching right with which a battle between players belonging to the battle group cannot be watched at a terminal of a player who is neither the organizer nor the players fighting the battle but can be watched through the terminal of the player registered as an organizer.

(2) In the information storage medium according to the present embodiment, information concerning some game media used by a player serving as an opponent need not be disclosed at the terminal of each of the players fighting the battle, and the watching function providing unit may provide the watching function such that the battle between the players can be watched at the terminal of a player having the watching right, said terminal disclosing the information concerning game media not disclosed to the players fighting the battle against each other.

(3) In the information storage medium according to the present embodiment, the watching right setting unit may be capable of setting a watching right with which a battle between players belonging to the battle group can be watched not only through the terminal of the player registered as an organizer but also through a terminal of a player who is neither the organizer nor the players fighting the battle.

(4) According to another embodiment of the invention, there is provided an information processing device for a game in which players fight a battle against each other, said information processing device including: a group generation unit for generating, in response to a request from a terminal of a player serving as an organizer, a battle group in which said player is registered as an organizer; a player registration unit for registering, in response to requests from terminals of a plurality of players different from the organizer, said plurality of players in the battle group; a watching right setting unit for setting, in response to a request from the terminal of the player serving as an organizer, a watching right concerning a battle between players belonging to the battle group; and a watching function providing unit for providing a watching function that allows a battle between players to be watched according to setting content about the watching right, wherein the watching right setting unit can set a watching right with which a battle between players belonging to the battle group cannot be watched at a terminal of a player who is neither the organizer nor the players fighting the battle but can be watched through the terminal of the player registered as an organizer.

(5) According to another embodiment of the invention, there is provided a method for controlling an information processing device for a game in which players fight a battle against each other, said method including: a group generation step of generating, in response to a request from a terminal of a player serving as an organizer, a battle group in which said player is registered as an organizer; a player registration step of registering, in response to requests from terminals of a plurality of players different from the organizer, said plurality of players in the battle group; a watching right setting step of setting, in response to a request from the terminal of the player serving as an organizer, a watching right concerning a battle between players belonging to the battle group; and a watching function providing step of providing a watching function that allows a battle between players to be watched according to setting content about the watching right, wherein in the watching right setting step, it is possible to set a watching right with which a battle between players belonging to the battle group cannot be watched at a terminal of a player who is neither the organizer nor the players fighting the battle but can be watched through the terminal of the player registered as an organizer.

In the above-described information storage medium, information processing device, and method for controlling an information processing device, it is possible to set a watching right with which a battle between players belonging to a battle group can be watched through the terminal of the player registered as an organizer but cannot be watched at the terminal of a player who is neither the player registered as an organizer nor the players fighting the battle. This allows the battle group to be properly managed while still maintaining fairness between the players, making it possible to enhance an interface environment for a game in which players fight a battle against each other.

Embodiments of the present invention will be described below. Note that the embodiment described below does not unjustifiably limit the content of the present invention as specified in the claims. Furthermore, not all the components described in the context of this embodiment are necessarily indispensable elements constituting the present invention.

1. Configuration of Information Processing System

FIG. 1 is a diagram showing the overall configuration of an information processing system 10 according to this embodiment. As shown in FIG. 1, in the information processing system 10, a server 20 and a plurality of player terminals 40 are connected via a network 30, such as the Internet, a mobile phone network, a LAN, or a WAN, whereby what is called a client-server communication system is configured. Furthermore, each of the plurality of player terminals 40 carries out communication mutually with the server 20 via the network 30 to transmit and receive various kinds of information. In addition, each of the plurality of player terminals 40 carries out communication mutually with the other player terminals 40 via the network 30 and the server 20 to transmit and receive various kinds of information.

The server 20 includes: a control unit 21 constituted of a processor, such as a CPU; a storage unit 22 constituted of a main storage device, such as a ROM or a RAM, and an auxiliary storage device, such as an HDD or an SSD; and a communication unit 23 constituted of a communication module or a communication interface. In the server 20, the control unit 21 executes various kinds of processing according to programs stored in the storage unit 22. In addition, the server 20, by means of the communication unit 23, receives information from the player terminals 40 and transmits, to the player terminals 40, information, etc., concerning the results of processing executed by the control unit 21.

Each of the player terminals 40 is a smartphone, a tablet, a personal computer, a portable game machine, a stationary game machine installed in a store or a home, or the like. Each of the player terminals 40 includes: a control unit 41 constituted of a processor, such as a CPU; a storage unit 42 constituted of a main storage device, such as a ROM or a RAM, and an auxiliary storage device, such as a flash memory, an HDD, or an SDD; an operation/input unit 43 constituted of a touchscreen, a keyboard, a microphone, etc.; a display unit 44 constituted of a liquid crystal display, an organic EL display, or the like; and a communication unit 45 constituted of a communication module or a communication interface. The player terminals 40 also execute various kinds of processing according to programs stored in the storage units 42. In addition, each of the player terminals 40, by means of the communication unit 45, receives information from the server 20 and transmits information to the server 20 and another player terminal 40.

Figure 2:
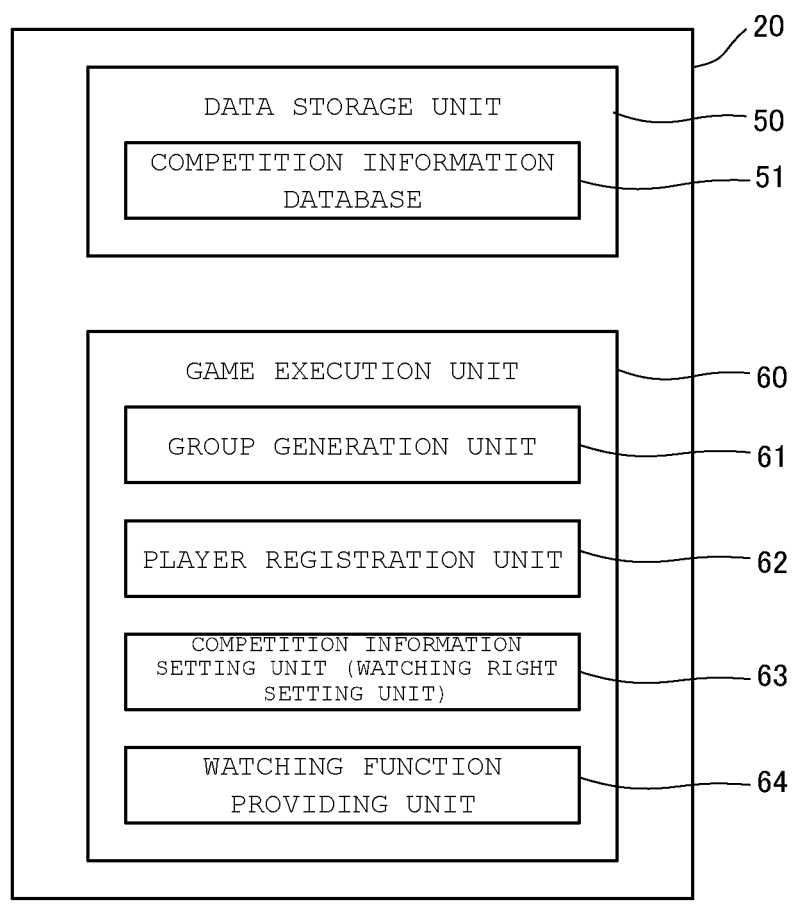
FIG. 2 is a functional block diagram regarding a function for allowing watching of a battle between players, among the functions realized by the information processing system.

FIG. 2 is a functional block diagram showing main functions of the server 20. The information processing system 10 according to this embodiment has: a function for allowing an arbitrary player serving as an organizer to hold a "user competition" in which a battle group including a plurality of players registered therein is generated, players belonging to the battle group fight a battle against each other by using game media resembling cards, and the players compete for ranking on the basis of the results of battles; and a function for enabling a player to watch a battle between other players belonging to the battle group through the screen of a player terminal 40 having a watching right in the "user competition". This embodiment will be described by way of an example where these functions are realized mainly by the server 20. It should be noted, however, that the aforementioned functions may be realized mainly by each of the player terminals 40 or realized so as to be shared among the server 20 and the player terminals 40. Also, in the server 20, the above-described functions are realized through cooperative operation between a data storage unit 50 and a game execution unit 60, as shown in FIG. 2.

The data storage unit 50 stores data used for the game execution unit 60 to execute various kinds of processing and is realized mainly by the storage unit 22.

In addition, the data storage unit 50 includes a competition information database 51, and data concerning battle groups are stored in the competition information database 51. The competition information database 51 stores, for example: a competition ID for identifying the "user competition"; a player ID of the organizer; player IDs of participants; battle rules (game method, format); a valid period of the battle group (start time and competition holding period of the "user competition"); an upper limit number of players who can participate; setting content about the watching right; history of comments made by the organizer and participants; and history of battles between players.

The game execution unit 60 executes processes such as: the process of managing players with player IDs; the process of starting a game when game start conditions are satisfied; the process of executing a game mode selected from among a plurality of kinds of game modes; the process of proceeding with a game; the process of generating an event when an event generation condition is satisfied; the process of computing game results; and the process of ending the game when game end conditions are satisfied. These processes are mainly realized by the control unit 21 and the communication unit 23. In addition, the game execution unit 60 also executes: the process of generating a battle group; the process of registering players wishing to participate in the battle group; the process of setting a watching right in the battle group; and the process of providing a watching function for a battle between players. The game execution unit 60 includes: a group generation unit 61; a player registration unit 62; a competition information setting unit (watching right setting unit) 63; and a watching function providing unit 64.

In response to a request from the player terminal 40 of the player serving as an organizer, the group generation unit 61 generates a battle group in which a plurality of players can participate. The information processing system 10 according to this embodiment allows a player serving as an organizer to hold a "user competition" in which the player generates a battle group in which a plurality of players participate, so that the players belonging to the battle group fight a battle against each other. The player serving as the organizer of the "user competition" can input setting content about the "user competition" on his/her own player terminal 40. Then, when the player completes inputting setting content about the "user competition" and performs a confirmation input as to holding the "user competition" on the player terminal 40 of the player serving as the organizer, a competition registration request including the input setting content is transmitted from the player terminal 40 to the server 20. On the basis of the received competition registration request, the group generation unit 61 generates a battle group by assigning a competition ID, which is information for identifying the battle group, generating a new competition record in the competition information database 51 in such a manner as to link the new competition record with this competition ID, and registering, as an organizer ID, the player ID of the player serving as the organizer in the generated competition record.

In this embodiment, the player registered as an organizer of any "user competition" can neither hold another "user competition" nor participate in another "user competition" as a participant until the competition holding period of the "user competition" organized by himself/herself ends. It should be noted, however, that the player registered as the organizer of a "user competition" may be able to hold another "user competition". In addition, the player registered as the organizer of a "user competition" may be able to participate in another "user competition" as a participant.

In response to a participation registration request from the player terminal 40 of a player other than the organizer, the player registration unit 62 registers that player in the battle group. In this embodiment, a search can be made for a "user competition" on the basis of the competition ID. When a player inputs the competition ID of a user competition to be searched for on his/her player terminal 40, the player registration unit 62, in response to a competition-ID search request from the player terminal 40: transmits competition information concerning that "user competition" to the player terminal 40 that has made the competition search request in the case where a "user competition" corresponding to the competition ID included in the competition-ID search request exists; and transmits, to the player terminal 40, information indicating that no "user competition" corresponding to the competition ID included in competition-ID search request exists in the case where no such "user competition" exists. Also, in the case where the "user competition" corresponding to the searched competition ID exists, the player wishing to participate in the "user competition" can perform, on his/her own player terminal 40, a confirmation input as to participation in the "user competition". Also, when a confirmation input as to the participation in the "user competition" is performed on the player terminal 40, a participation registration request including the competition ID and the player's own player ID is transmitted from the player terminal 40 to the server 20.

On the basis of the received participation registration request, the player registration unit 62 stores, in the competition record corresponding to the competition ID, the player ID included in the participation registration request and registers a new player in the battle group composed of participants in the "user competition". Note that, in this embodiment, it is not possible to accept the participation of more players than the upper limit number set by the organizer. For this reason, when a player wishing to participate in a battle group has made a search for the competition ID, the player cannot perform a confirmation input as to participation in the battle group if the number of players participating in the battle group of the "user competition" corresponding to the competition ID reaches the upper limit number.

In this embodiment, a player registered as a participant in any "user competition" can neither hold another "user competition" nor participate in another "user competition" as a participant until the competition holding period of the "user competition" in which the player himself/herself participates ends. It should be noted, however, that the player registered as a participant in a "user competition" may be able to hold another "user competition". In addition, the player registered as a participant in a "user competition" may be able to participate in another "user competition" as a participant.

On the basis of the competition registration request from the player terminal 40 of the player serving as an organizer, the competition information setting unit 63 stores the setting content about the "user competition" in the competition record generated in the competition information database 51. In this embodiment, the watching right setting unit is realized as one of the functions of the competition information setting unit 63 and sets a watching right concerning the "user competition" in response to the competition registration request from the player terminal 40 of the player registered as the organizer. In this embodiment, one of "organizer only", "organizer and all participants", and "no watching" can be selected as the setting content about the watching right.

The setting content "organizer only" indicates a watching right for disabling watching of a battle between players belonging to the battle group on the player terminals 40 of players who are neither the organizer nor the players fighting the relevant battle but enabling watching of the relevant battle through the player terminal 40 of the player registered as the organizer.

The setting content "organizer and all participants" indicates a watching right for enabling watching of a battle between players belonging to the battle group not only on the player terminal 40 of the player registered as the organizer but also on the player terminals 40 of players who are neither the organizer nor the players fighting the relevant battle.

The setting content "no watching" grants no players a watching right. In other words, no players can watch a battle between players belonging to the battle group.

Note that the watching right setting unit may be realized as a function independent of the competition information setting unit 63. For example, it is also acceptable that no watching right is set at the time a "user competition" is registered and a watching right is set separately by using a user interface of the player terminal 40 of the player registered as the organizer after the "user competition" has been registered.

In addition, it is also acceptable that the setting content about the watching right can be changed by using a user interface of the player terminal 40 of the player registered as the organizer after the setting content about the "user competition" has been registered. In the case where the setting content about the watching right can be changed, it is acceptable that the setting content about the watching right can be changed only during the period from when the "user competition" is registered to the start time and cannot be changed while the "user competition" is being held.

The watching function providing unit 64 provides a watching function for enabling watching of a battle between players according to the setting content about the watching right for the battle group. In this embodiment, a player can input a watch application on his/her player terminal 40 if the player has a watching right. When a player wishing to watch a battle between players inputs a watch application, a watch application request is transmitted from the player terminal 40 to the server 20.

In response to the watch application request received from the player terminal 40 of the player having a watching right, the watching function providing unit 64 provides a watching function by registering the player as a watcher and transmitting, to the player terminal 40 of the player registered as a watcher, information necessary for game computations, such as information input by each of the players fighting the battle to be watched. At the player terminal 40, the control unit 41 executes game computations based on the information, etc. that has been input by each of the players and that has been received from the server 20, generates an image related to a watch screen on the basis of results of the computations, and displays the watch screen on the display unit 44 of the player terminal 40, thereby allowing watching of the progress of the battle between players.

In this embodiment, during a battle between players, information concerning some of the game media used by the player acting as the opponent is not disclosed on the player terminal 40 of each of the players fighting the battle. The watching function providing unit 64 provides the watching function so as to allow watching of the battle between the players on the player terminals 40 of the players having a watching right while disclosing, on the player terminals 40, information concerning the game media that is not disclosed to the players fighting the battle.

In providing a battle function in the form of a card game, the game execution unit 60 processes field cards and hand cards as follows. That is, among the hand cards and the field cards acquired from the player terminal 40 of one player, the field cards are processed such that regular card information concerning the field cards is transmitted by the game execution unit 60 to the player terminal 40 of the other player, and the hand cards are processed such that common dummy card information indicating that the card is a hand card is transmitted by the game execution unit 60 to the player terminal 40 of the other player. Thus, each of the player terminals 40 that have received card information executes game computations by treating regular card information as a field card and treating dummy card information as a hand card with reference to the card information database stored in the storage unit 42. Consequently, players fighting a battle against each other do not possess, in their respective player terminals 40, card information concerning the hand cards of the opponent and thus cannot grasp the kinds of the hand cards not disclosed on an in-battle game screen. By doing so, even if a player analyzes his/her player terminal 40 by using an unauthorized method, it is possible to prevent such fraudulent activity because card information concerning the hand cards of the opponent does not exist in the storage unit 42 of his/her player terminal 40.

On the other hand, when providing the watching function in the card game, the watching function providing unit 64 transmits the card information concerning the hand cards and the field cards of both players fighting the battle to the player terminals 40 of the watchers. By doing so, the watching function is provided in such a manner as to disclose all the hand cards that are not disclosed to the players fighting the battle, thereby enabling the watchers to watch the battle between the players in an environment in which the watchers can properly grasp the situation of each of the players fighting the battle.

Another aspect of providing the watching function may be such that the server 20 is made responsible for executing game computations, the results of the computations are transmitted to the player terminals 40 of the watchers, an image related to the watch screen is generated on each of the player terminals 40 on the basis of the received results of computations, and the watch screen is displayed on the display unit 44.

Still another aspect of providing the watching function may be such that the server 20 is made responsible for executing game computations and generating an image related to the watch screen, data concerning an image related to the watch screen is transmitted to the player terminal 40 of each of the watchers, and the watch screen is displayed on the display unit 44 of the player terminal 40 on the basis of the data concerning the received image.

The watching function is not limited to those for allowing watching of the battle currently in progress, and yet another aspect of providing the watching function may be such that a battle extracted from the history of past battles is reproduced as the watch screen, which is then displayed on the display unit 44.

2. Control Method in this Embodiment

A method for controlling this embodiment will be described below in detail by way of an example where the game program according to this embodiment is applied to a game application in a player terminal 40 provided as a smartphone.

Figure 3:
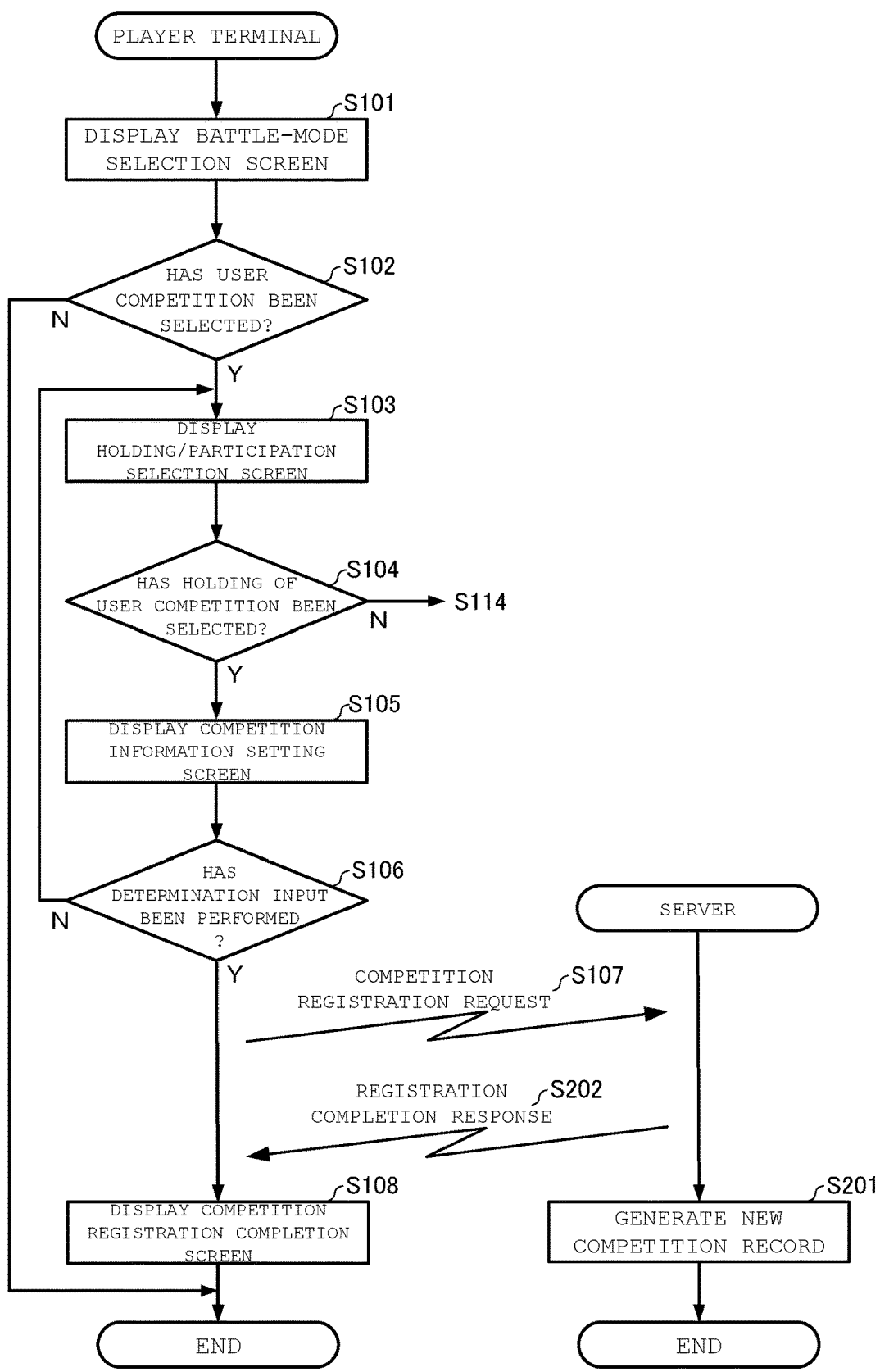
FIG. 3 is a flowchart showing an example of processing executed in the information processing system.

FIG. 3 is a flowchart showing an example of processing in the server 20 and the player terminal 40 regarding the generation of a battle group used for a player A serving as an organizer to hold a "user competition" in which a plurality of players participate.

Figure 4:
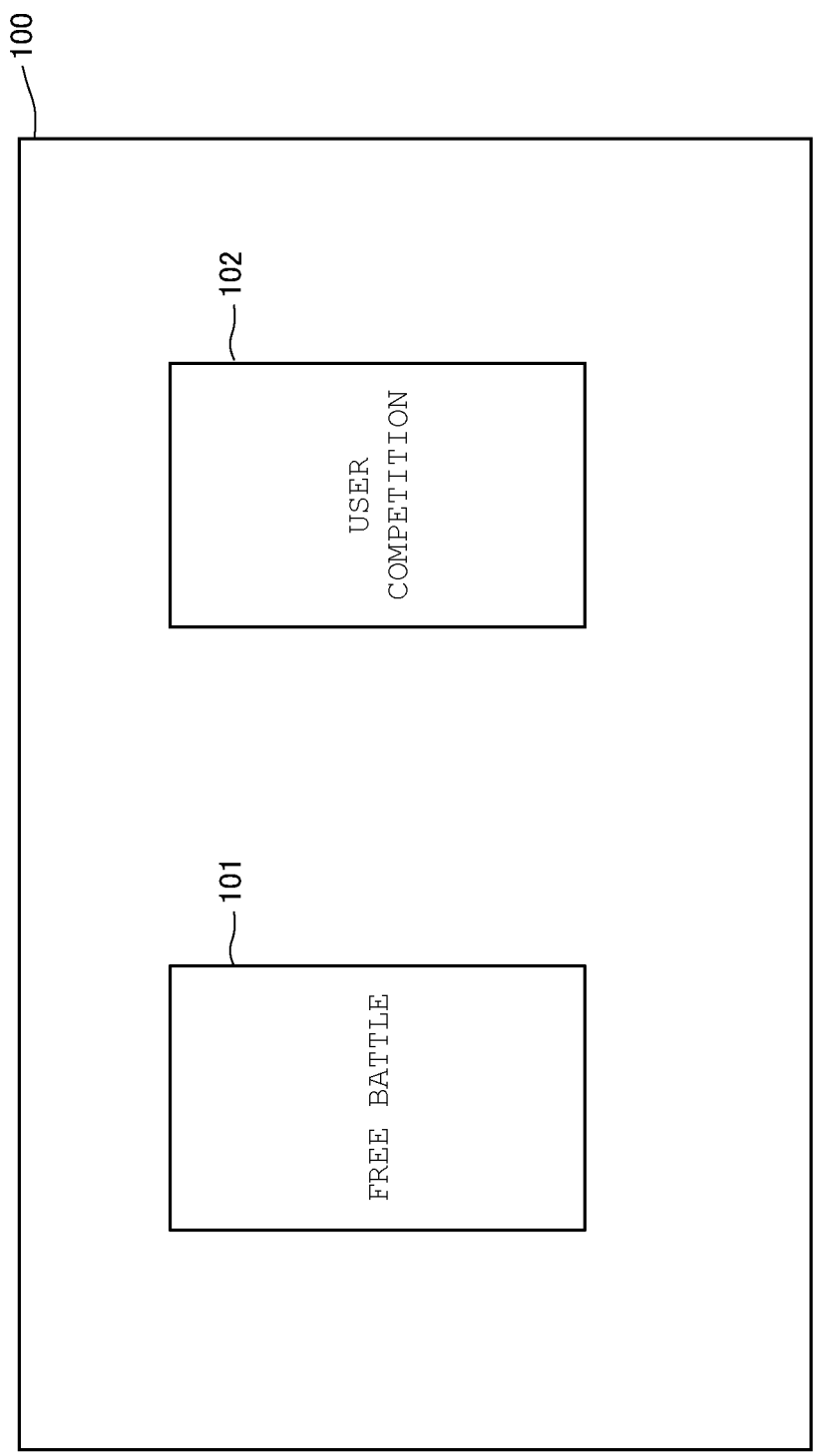
FIG. 4 is a diagram showing an example of a battle-mode selection screen displayed on a player terminal.

First, in the player terminal 40 of the player A, the control unit 41 starts the game program stored in the storage unit 42, and displays a battle-mode selection screen 100 shown in FIG. 4 on the display unit 44 when the player A performs a predetermined input (step S101). On the battle-mode selection screen 100, an icon image 101 for "free battle" and an icon image 102 for "user competition" are displayed. As a result of the player A performing an input by touching one of the icon images, either "free battle" or "user competition" can be selected as a battle mode. In the battle mode "free battle", players selected from among an unspecified number of players are matched against each other to fight a battle, and in the battle mode "user competition", players belonging to the battle group for the competition fight a battle against each other.

Figure 5:
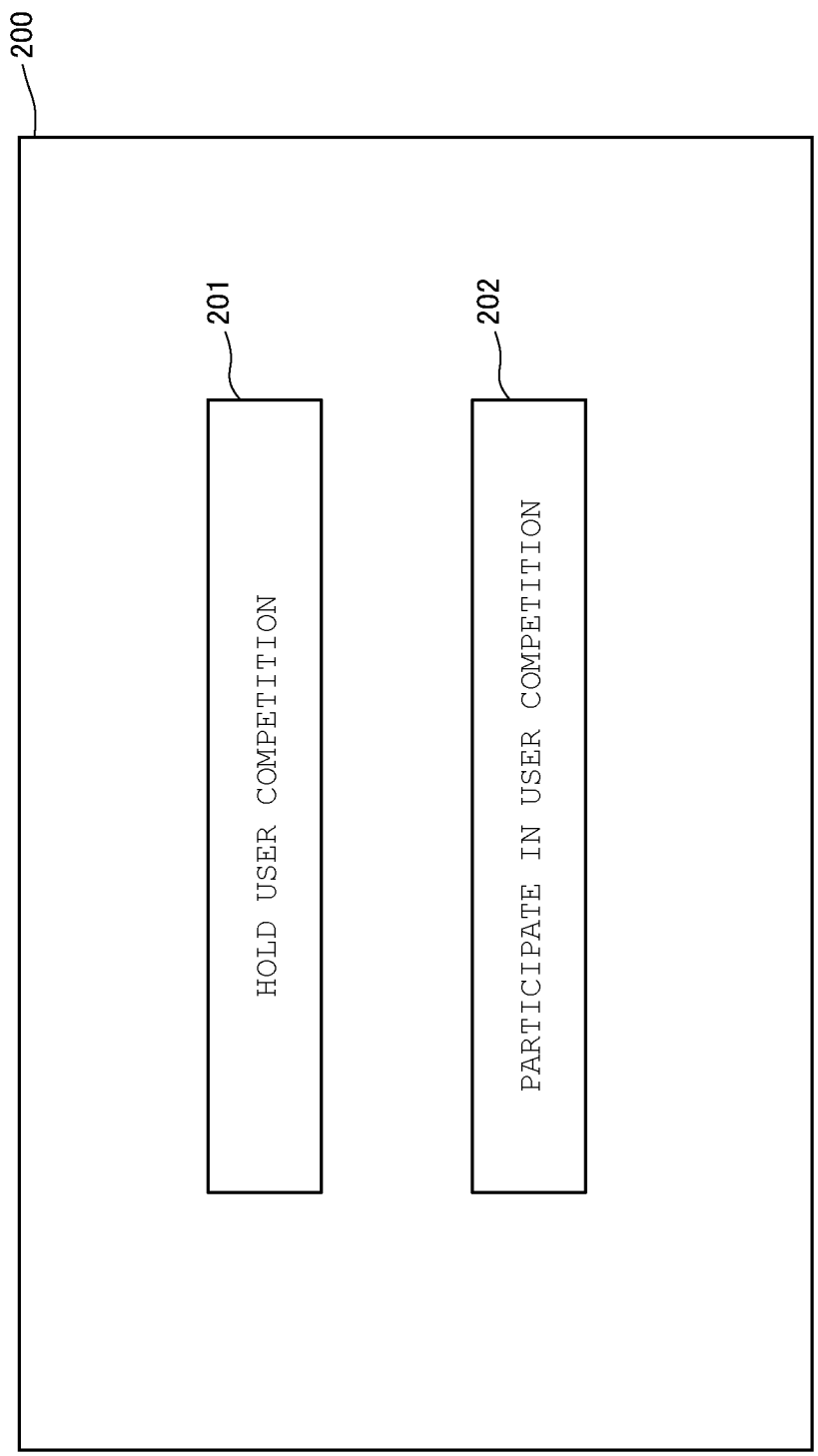
FIG. 5 is a diagram showing an example of a holding/participation selection screen displayed on the player terminal.

When the player A performs an input by touching the icon image 102 for "user competition" while the battle-mode selection screen 100 is being displayed (Y in step S102), the control unit 41 displays, on the display unit 44, a holding/participation selection screen 200 for selecting either to hold a user competition or to participate in an existing user competition (step S103), as shown in FIG. 5. On the holding/participation selection screen 200, an icon image 201 with the message "hold user competition" and an icon image 202 with the message "participate in user competition" are displayed, and the player A can select either one by performing an input by touching one of the icon images. Note that in the case where the player A performs an input by touching the icon image 101 for "free battle" while the battle-mode selection screen 100 is being displayed (N in step S102), this processing ends, and processing related to "free battle" is executed.

Figure 6:
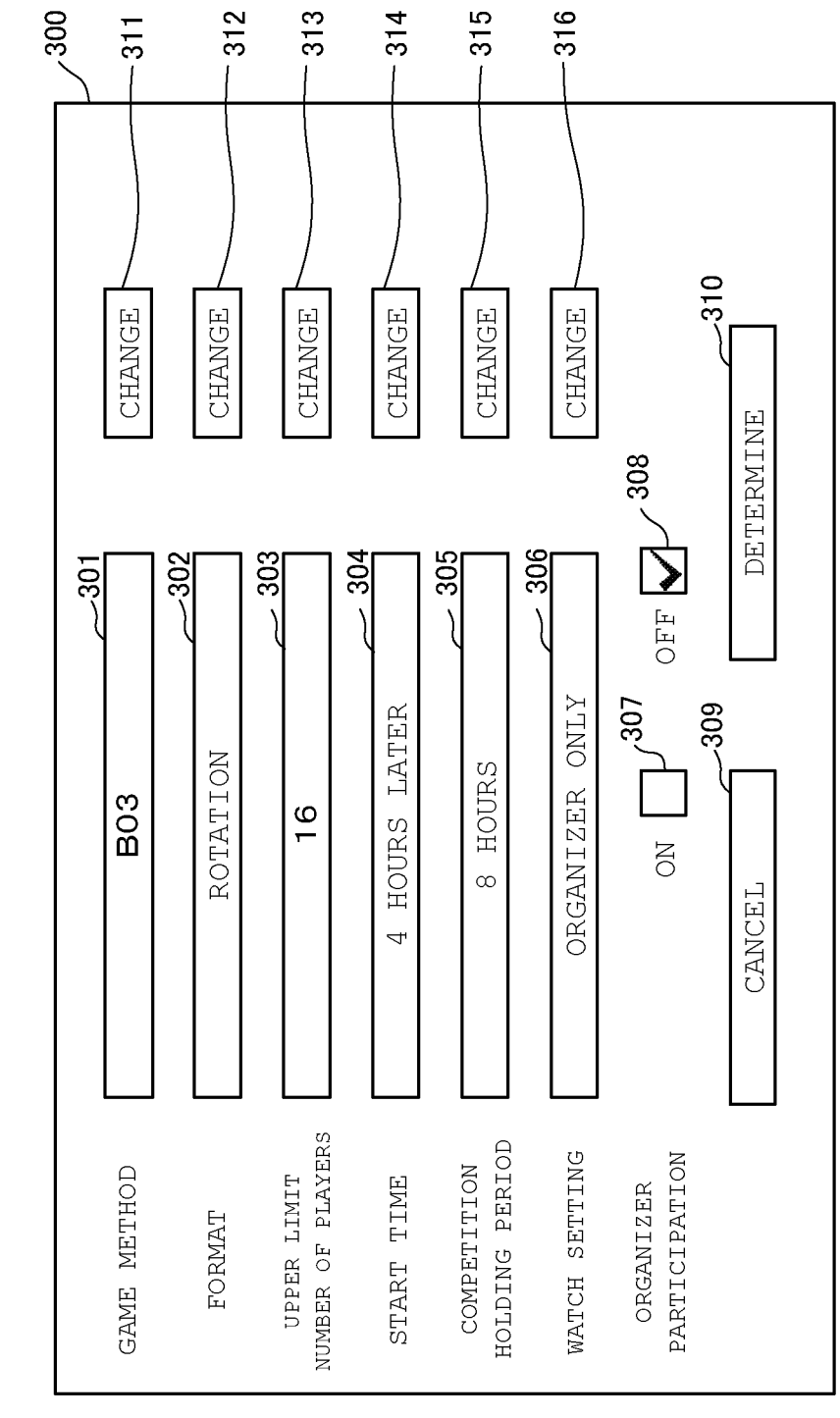
FIG. 6 is a diagram showing an example of a competition information setting screen displayed on the player terminal.

In the case where the player A performs an input by touching the icon image 201 for "hold user competition" while the holding/participation selection screen 200 is being displayed (Y in step S104), the control unit 41 displays, on the display unit 44, a competition information setting screen 300 shown in FIG. 6 (step S105). Note that in the case where the player A performs an input by touching the icon image 202 for "participate in user competition" while the holding/participation selection screen 200 is being displayed (N in step S104), the control unit 41 executes processing in step S114 and the subsequent steps in accordance with the flowchart shown in FIG. 12, which will be described below.

The competition information setting screen 300 is a screen for setting information needed to hold a "user competition". In the game application according to this embodiment, two players fight a battle, for example, by showing cards using card decks each composed of 30 cards. The player A serving as an organizer can perform an input for setting each of the items including "game method", "format", "upper limit number of players", "start time", "competition holding period", "watch setting", and "organizer participation" by using the competition information setting screen 300.

The item "game method" is used to set a battle settling condition. In this embodiment, as shown in FIG. 7, the player A can select one of the three types of battles: "BO1", in which only one round is played and the game is settled by either side winning once; "BO3", in which a maximum of five rounds are played and the game is settled by either side winning three times; and "BO5", in which a maximum of nine rounds are played and the game is settled by either side winning five times. In the example shown in FIG. 6, "BO3" is selected, as shown in a display region 301. The player A can perform an input for changing the "game method" by touching a change button 311.

The item "format" is used to set a restriction on the type of cards that can be contained in a card deck used for the battle. In this embodiment, as shown in FIG. 7, "rotation" and "unlimited" can be selected as the "format". The "rotation" format allows only predetermined types of cards to be contained in a card deck, and the "unlimited" format allows all types of cards to be contained in a card deck without any restrictions on the card type. In the example shown in FIG. 6, the "rotation" format is selected, as shown in a display region 302, and the player A can perform an input for changing the "format" by touching a change button 312.

The item "upper limit number of players" is used to set the number of battle-fighting players who can participate in the battle group. In this embodiment, the "upper limit number of players" can be set between 3 and 64, as shown in FIG. 7. In the case where the organizer participates in the battle group as a player fighting a battle, the number of players includes the organizer. In the case where the organizer does not participate in the battle group as a player fighting a battle, the number of players does not include the organizer. In the example shown in FIG. 6, the "upper limit number of players" is set to 16, as shown in a display region 303, and the player A can perform an input for changing the "upper limit number of players" by touching a change button 313.

The item "start time" is used to set the time period from when the "user competition" is registered in the server 20 to when a battle can be started. In this embodiment, as shown in FIG. 7, the "start time" can be set to one of 1 hour later, 2 hours later, 3 hours later, 4 hours later, 8 hours later, 12 hours later, and 24 hours later. In the example shown in FIG. 6, 4 hours later is selected, as shown in a display region 304, and the player A can perform an input for changing the "start time" by touching a change button 314.

The item "competition holding period" is used to set a valid period during which the start of a battle in the "user competition" is accepted (application for a battle in response to a battle invitation is accepted). In this embodiment, as shown in FIG. 7, the "competition holding period" can be set to one of 1 hour, 2 hours, 3 hours, 4 hours, 8 hours, 12 hours, and 24 hours. In the example shown in FIG. 6, 8 hours is selected, as shown in a display region 305, and the player A can perform an input for changing the "competition holding period" by touching a change button 315.

The item "watch setting" is used to set a watching right for specifying which players are allowed to watch, through their respective player terminals 40, a battle between players in the "user competition". In this embodiment, as shown in FIG. 7, the item "watch setting" can be set to one of "organizer only", "organizer and participants", and "no watching". In the example shown in FIG. 6, "organizer only" is selected, as shown in a display region 306, and the player A can perform an input for changing the "watch setting" by touching a change button 316.

The item "organizer participation" is used to set whether or not the player serving as the organizer (player A in this embodiment) also participates in the battle group as a participant who fights a battle. In this embodiment, the item "organizer participation" can be set to either "on" or "off", as shown in FIG. 7. When the item "organizer participation" is set to "on", the organizer is registered as a participant and can fight a battle as a player in the "user competition". In addition, when the item "organizer participation" is set to "off", the organizer is not registered as a participant and cannot fight a battle as a player in the "user competition". In the example shown in FIG. 6, a check box 308 "off" is checked, indicating that the item "organizer participation" is set to "off". The player A can switch the setting for the item "organizer participation" by performing an input by touching a check box 307 "on", which causes the check box 308 "off" to be unchecked and the check box 307 "on" to be checked.

On the competition information setting screen 300 shown in FIG. 6, a cancel button 309 and a determination button 310 are provided. When the player A performs an input by touching the determination button 310 (Y in step S106), the control unit 41 transmits, to the server 20, a competition registration request including the player ID of the player A serving as an organizer and information concerning the setting items (step S107). Note that when the player performs an input by touching the cancel button 309 (N in step S106), the flow returns to the processing in step S103, and the holding/participation selection screen 200 is displayed on the display unit 44.

At the server 20, upon receiving the competition registration request from the player terminal 40, the control unit 21 generates, in the storage unit 22, a competition record based on the information included in the received competition registration request (step S201). When generating the competition record, the control unit 21 assigns a "competition ID" and stores, in the competition record generated in the storage unit 22, the "organizer ID" (player ID of the player A serving as the organizer), "game method", "format", "upper limit number of players", "start time", "competition holding period", "watch setting", "organizer participation", etc. in association with the "competition ID".

Figure 8:
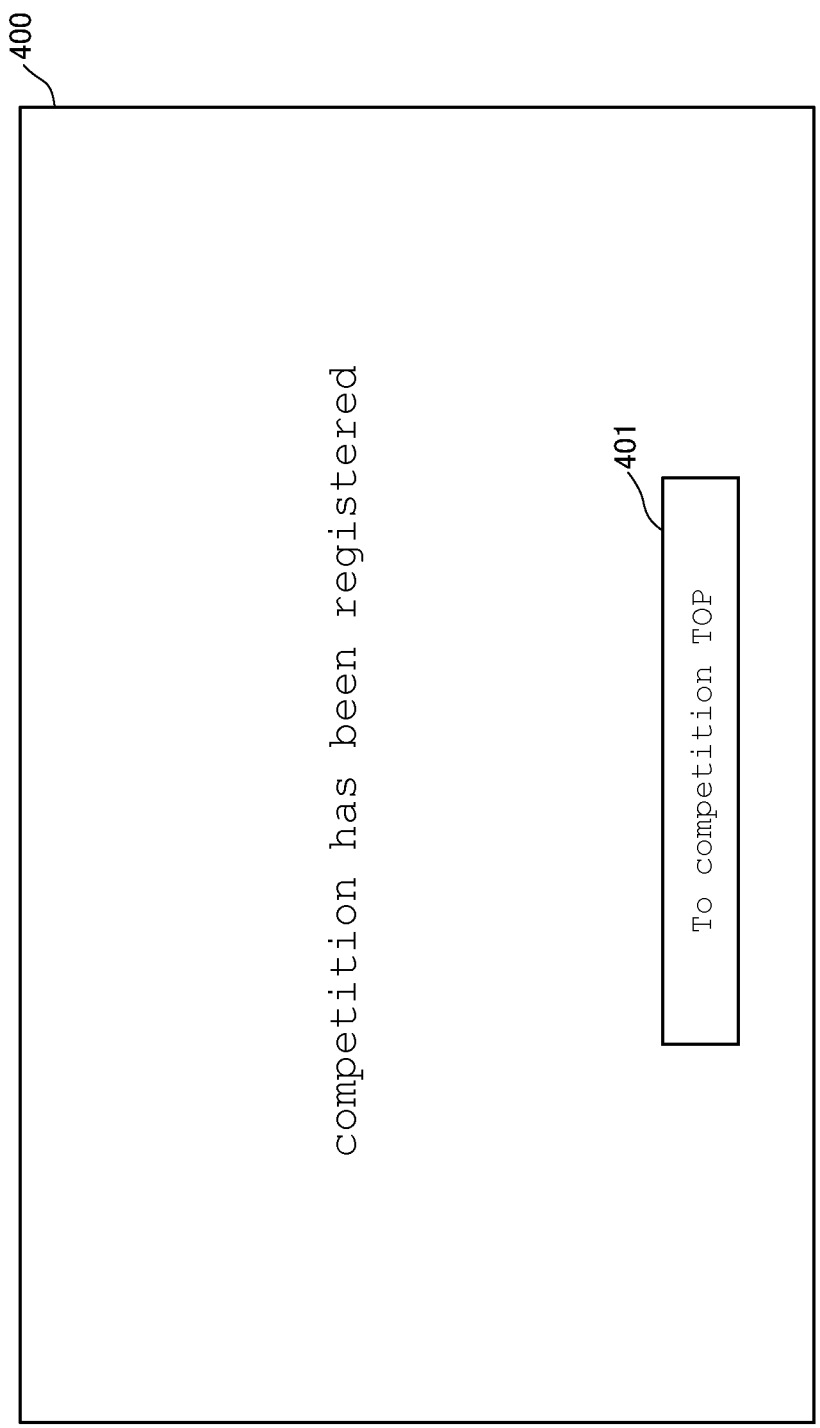
FIG. 8 is a diagram showing an example of a competition registration completion screen displayed on the player terminal.

When completing the generation of the competition record, the control unit 21 transmits a registration completion response to the player terminal 40 of the player A serving as the organizer (step S202). At the player terminal 40 of the player A, upon receiving the registration completion response from the server 20, the control unit 41 displays, on the display unit 44, a competition registration completion screen 400 shown in FIG. 8 (step S108).

On the competition registration completion screen 400, a message indicating that competition registration has been completed is displayed. In addition, the competition registration completion screen 400 is provided with a screen transition button 401 for transitioning to a basic screen of the "user competition" registered in the server 20. When the player A performs an input by touching the screen transition button 401, a basic screen exclusively used for the "user competition" held by the player A is displayed on the display unit 44.

Figure 9:
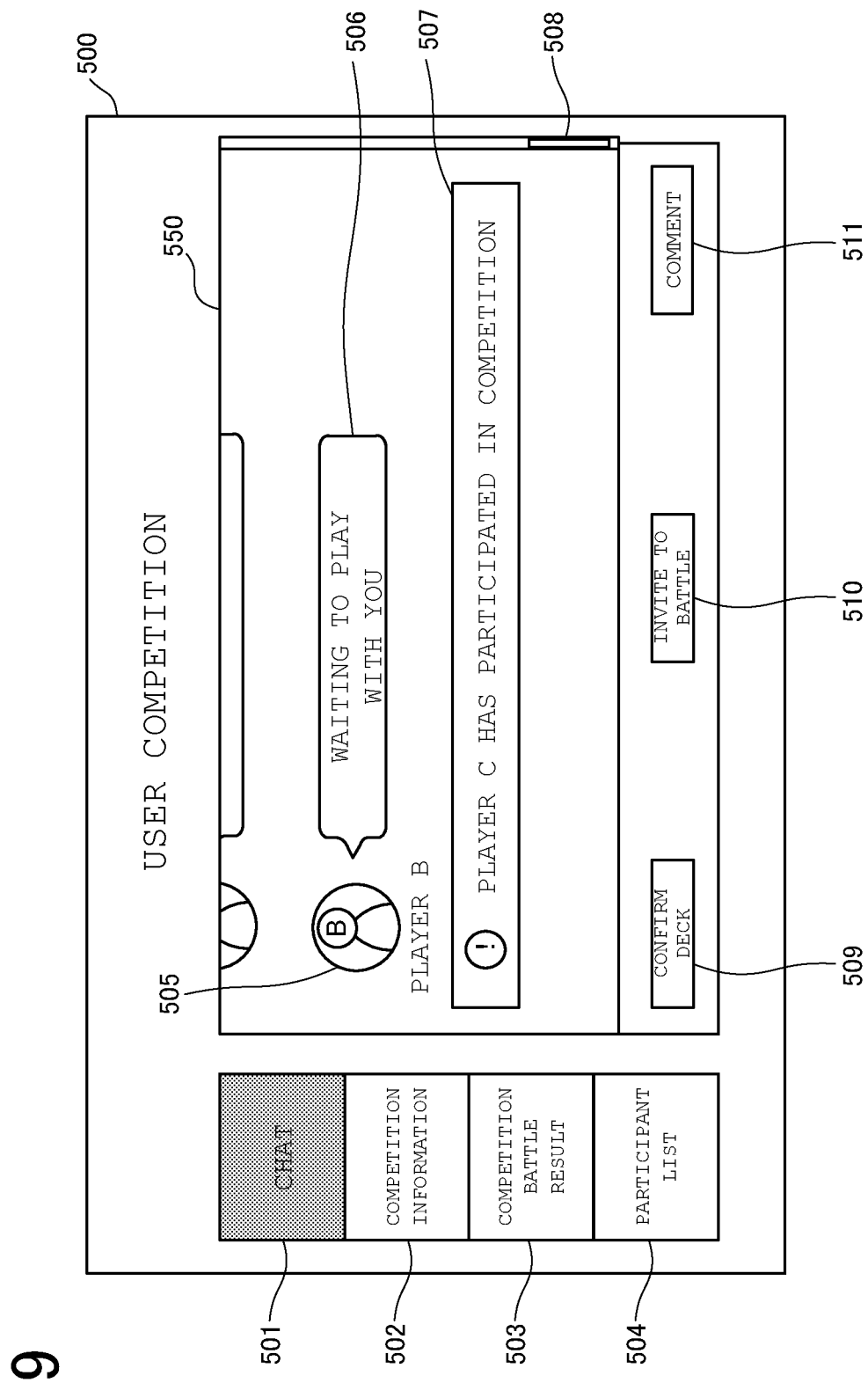
FIG. 9 is a diagram showing an example of a competition top screen displayed on the player terminal.

A competition top screen 500 shown in FIG. 9 is an example of the basic screen. The display modes on the competition top screen 500 include "chat", "competition information", "competition battle results", and "list of participants". In the display mode "chat", comments transmitted by the organizer and participants from their respective player terminals 40, notifications from the server 20, etc. are displayed. A battle invitation, an application for a battle, and battle watching in the "user competition" are performed by using the display mode "chat". In the display mode "competition information", setting information, such as the "competition ID", "game method", "format", "upper limit number of players", "start time", "competition holding period", "watch setting", and "organizer participation", stored in the competition record is viewed. In the display mode "competition battle results", ranking, etc. based on the history of battles of the players registered as participants is displayed. In the display mode "list of participants", a list of the players registered as participants is displayed.

On the competition top screen 500, a chat button 501 for selecting "chat", a competition information button 502 for selecting "competition information", a competition battle result button 503 for selecting "competition battle results", and a participant list button 504 are provided. When the player A performs an input by touching each of the buttons, the control unit 41 switches the display mode.

In addition, in the case where the display mode is "chat" on the competition top screen 500 as shown in FIG. 9, a comment 506 transmitted by the organizer and participants from their respective player terminals 40, a notification 507 transmitted from the server 20, etc. are time-sequentially displayed in a chat display region 550. The comment 506 transmitted by the organizer and participants from their respective player terminals 40 has an icon image 505 linked to the player ID who has made this comment. In addition, the history of display content, such as the comment 506 and the notification 507, is stored in the competition record generated in the storage unit 22 of the server 20, and the player terminal 40 downloads the history of display content from the server 20 and displays the history in the chat display region 550. In addition, a scroll bar 508 is provided in the chat display region 550 of the competition top screen 500, so that the history of display content can be viewed seamlessly by means of a touch input by dragging and sliding the slider.

In addition, a deck confirmation button 509, a battle invitation button 510, and a comment button 511 are provided below the chat display region 550 of the competition top screen 500. The deck confirmation button 509 is used to confirm the contents of the card deck used in a battle of the "user competition". The battle invitation button 510 is used to invite, to a battle, participants participating in the "user competition". The comment button 511 is used to invoke a comment input form.

Figure 10:
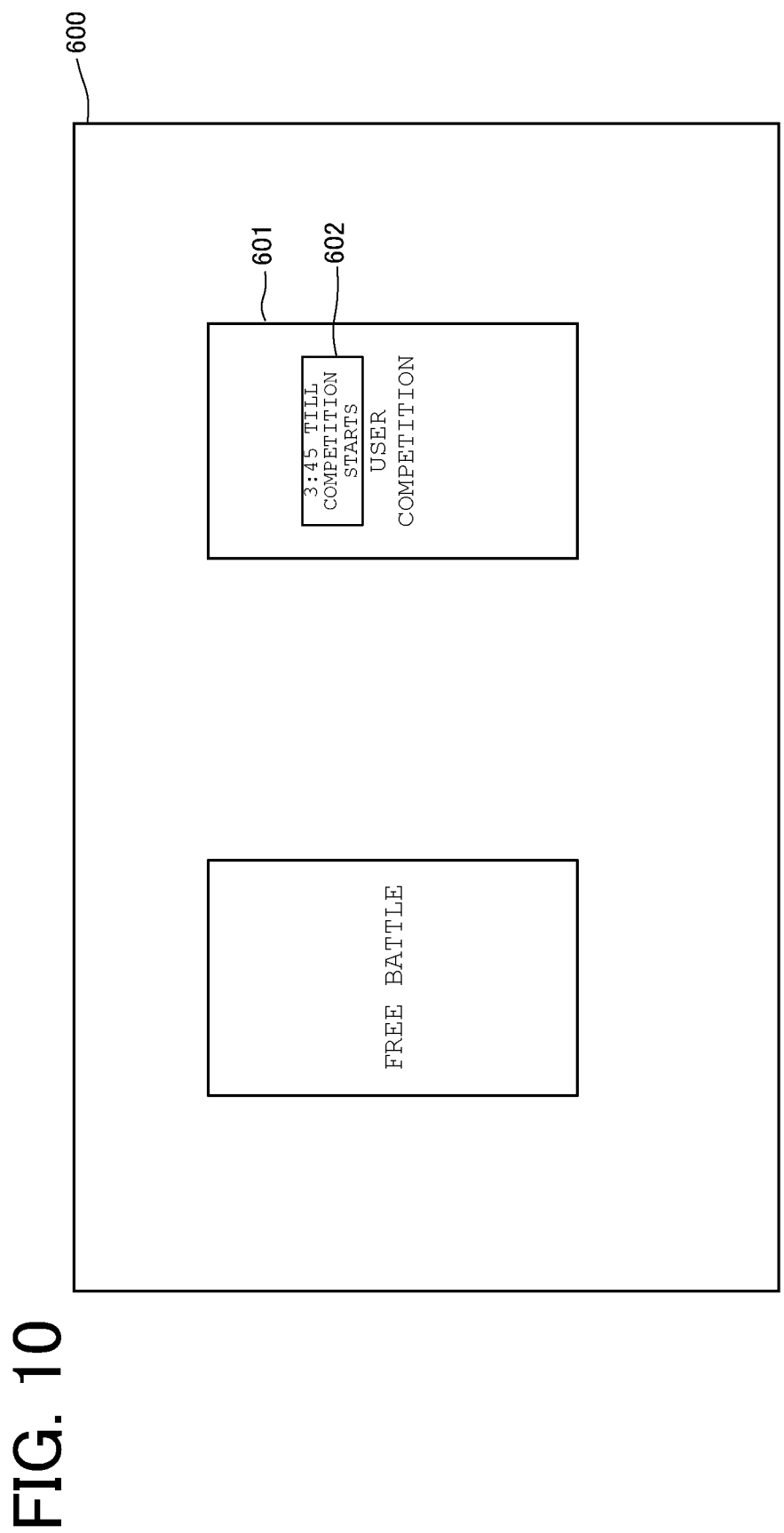
FIG. 10 is a diagram showing an example of the battle-mode selection screen displayed on the player terminal.

In addition, at the player terminal 40 of the player A after he/she has registered the "user competition" in the server 20, the control unit 41 displays, on a battle-mode selection screen 600 until the start time of the "user competition", a countdown image 602, which indicates the time remaining until the start time of the "user competition", in such a manner as to be superimposed onto an icon image 601 for the "user competition", as shown in FIG. 10, and changes the time displayed on the countdown image 602 as time elapses. With this user interface, it is possible to grasp the time remaining until a battle of the "user competition" can be started. Note that this user interface is also displayed on the player terminals 40 of the players registered as participants in the "user competition" organized by the player A.

The information concerning the time remaining until the start time of the "user competition" at the time of displaying the battle-mode selection screen 600 is acquired by the player terminal 40 from the server 20 as a response from the server 20 when the server 20 is notified by the player terminal 40 that the player has performed an input for transitioning to the battle-mode selection screen 600. After acquiring the information concerning the time remaining until the start time of the "user competition" from the server 20, the control unit 41 of the player terminal 40 keeps time by timer processing and reflects the remaining time on the countdown image 602 on the battle-mode selection screen 600.

Figure 11:
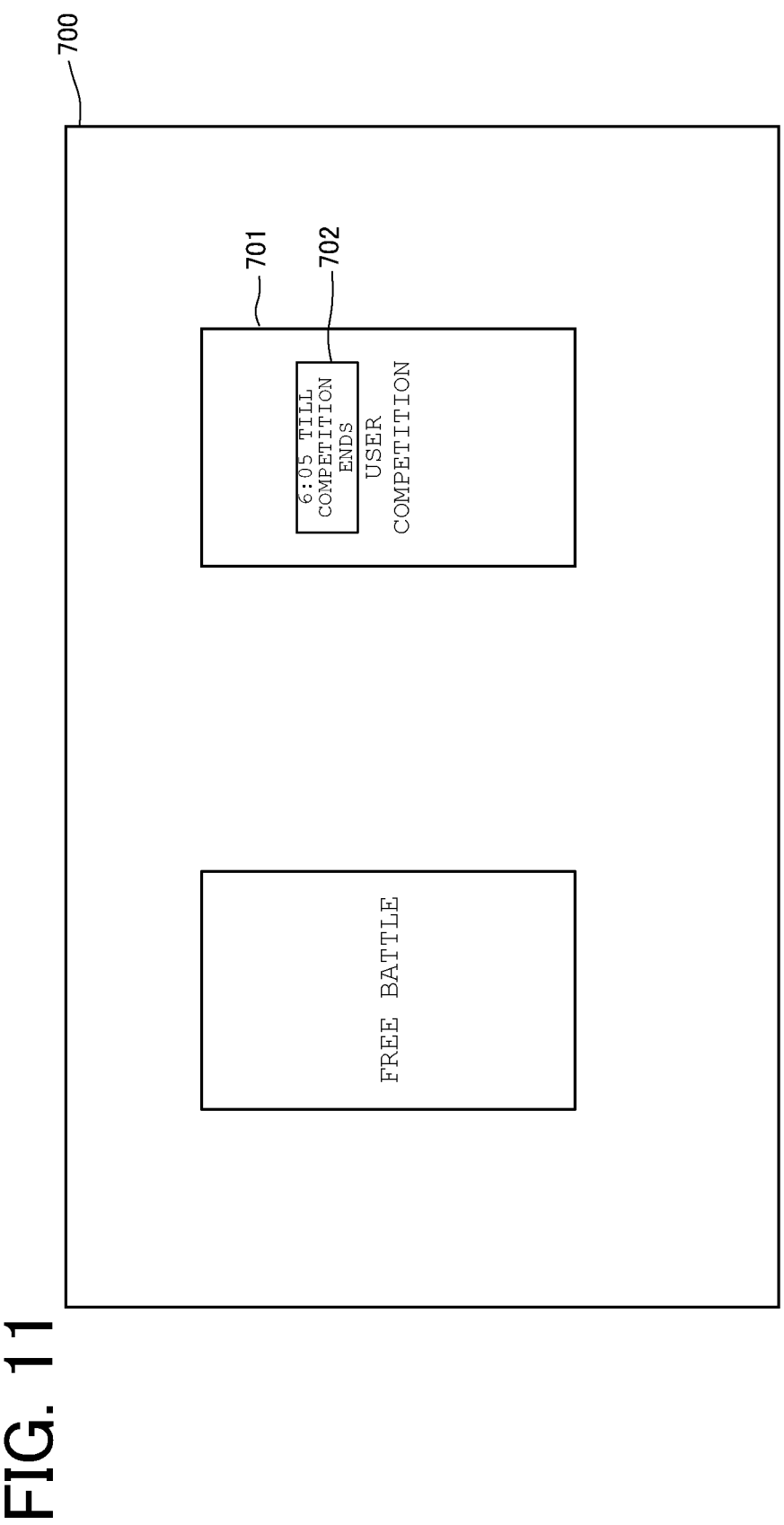
FIG. 11 is a diagram showing an example of the battle-mode selection screen displayed on the player terminal.

In addition, at the player terminal 40 of the player A after the start time of the "user competition", the control unit 41 displays, on a battle-mode selection screen 700, a countdown image 702, which indicates the time remaining until the end time of the "user competition", in such a manner as to be superimposed onto an icon image 701 for the "user competition", as shown in FIG. 11, and changes the time displayed on the countdown image 702 as time elapses. With this user interface, it is possible to grasp the time remaining until the acceptance of a battle in the "user competition" ends. Note that this user interface is also displayed on the player terminals 40 of the players registered as participants in the "user competition" organized by the player A.

Figure 12:
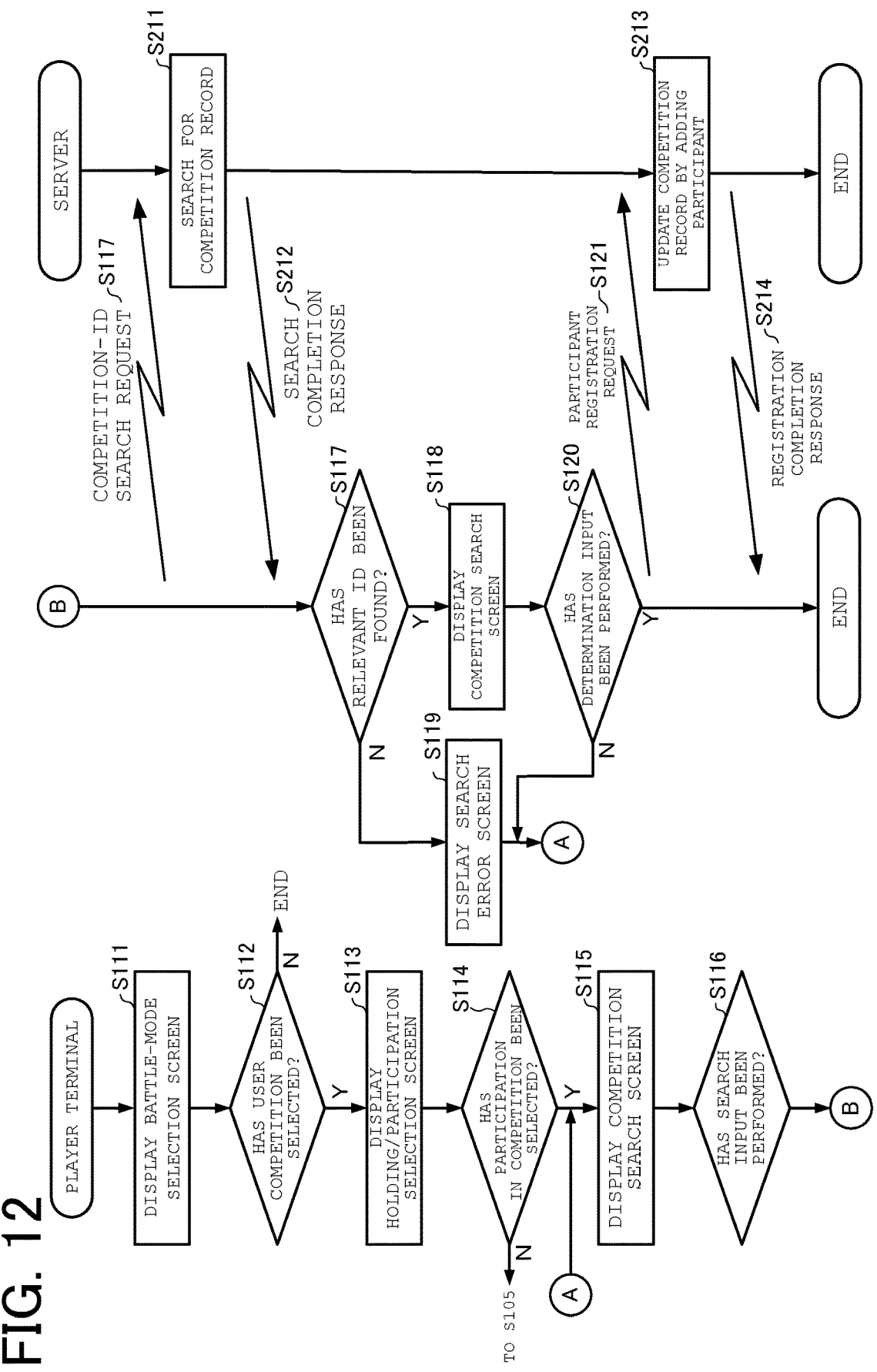
FIG. 12 is a flowchart showing an example of processing executed in the information processing system.

FIG. 12 is a flowchart showing an example of processing in the server 20 and the player terminal 40, i.e., the processing that is executed until a player B wishing to participate in a "user competition" organized by the player A is registered as a participant in the battle group of the "user competition" organized by the player A.

First, at the player terminal 40 of the player B, the control unit 41 starts the game program stored in the storage unit 42, and displays the battle-mode selection screen 100 shown in FIG. 4 on the display unit 44 when the player B performs a predetermined input (step S111). The icon image 101 for "free battle" and the icon image 102 for "user competition" are displayed on the battle-mode selection screen 100, and the player B can select one of "free battle" and "user competition" as a battle mode by performing an input by touching one of the icon images.

When the player B performs an input by touching the icon image 102 for "user competition" while the battle-mode selection screen 100 is being displayed (Y in step S112), the control unit 41 displays, on the display unit 44, the holding/participation selection screen 200 for selecting either to hold a user competition or to participate in an existing user competition, as shown in FIG. 5 (step S113). Note that in the case where the player B performs an input by touching the icon image 101 for "free battle" while the battle-mode selection screen 100 is being displayed (N in step S112), this processing ends, and processing related to "free battle" is executed.

Figure 13:
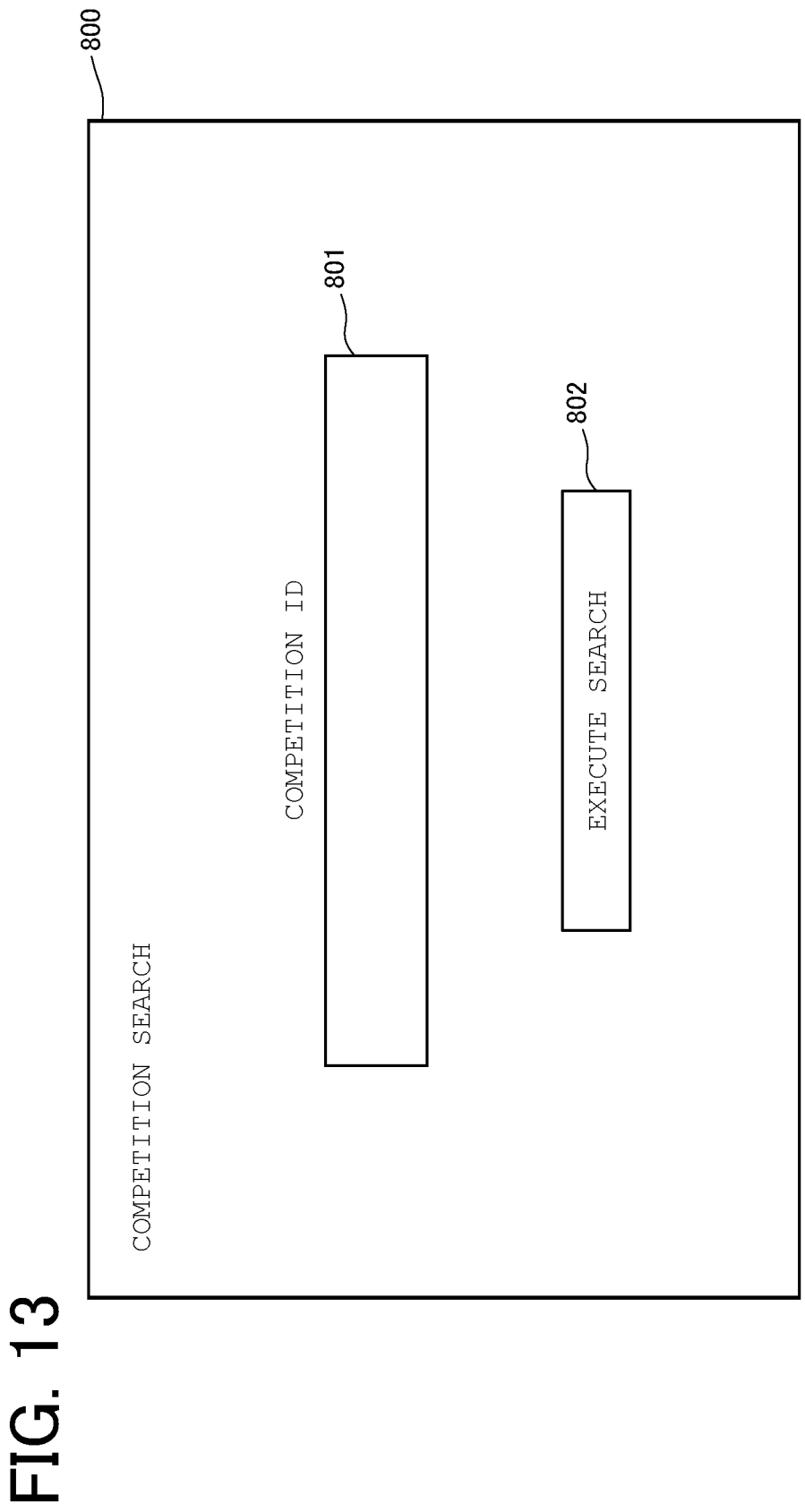
FIG. 13 is a diagram showing an example of a competition search screen displayed on the player terminal.

In the case where the player B performs an input by touching the icon image 202 for "participate in user competition" while the holding/participation selection screen 200 is being displayed (Y in step S114), the control unit 41 displays a competition search screen 800 shown in FIG. 13 on the display unit 44 (step S115). In the case where the player B performs an input by touching the icon image 201 for "hold user competition" while the holding/participation selection screen 200 is being displayed (N in step S114), the control unit 41 executes processing in step S105 and the subsequent steps in accordance with the aforementioned flowchart shown in FIG. 3.

Figure 14:
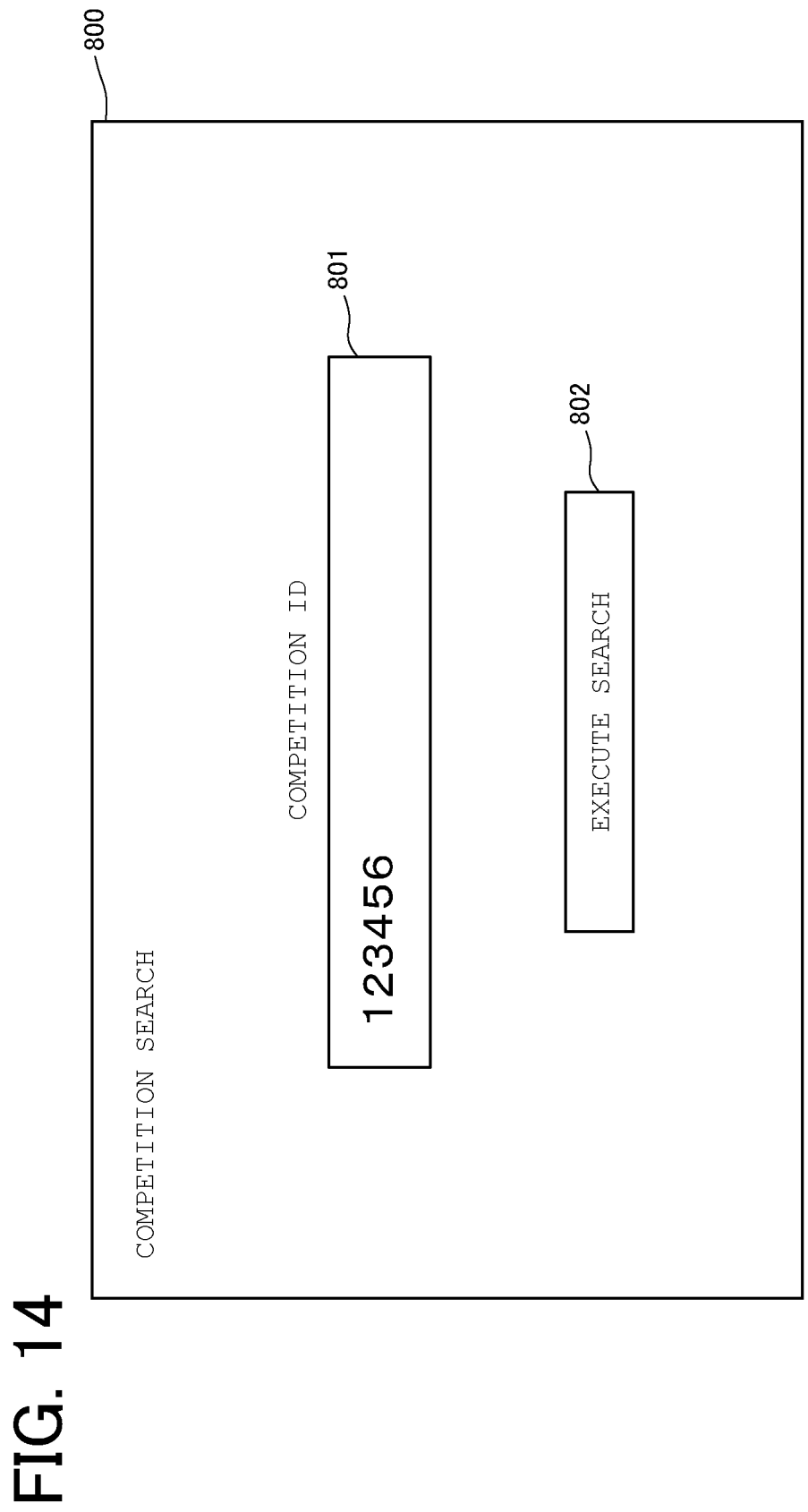
FIG. 14 is a diagram showing an example of the competition search screen displayed on the player terminal.

A competition-ID input region 801 and a search execution button 802 are provided on the competition search screen 800. The player B can grasp a competition ID (e.g., 123456) on the basis of a direct message from the player A or by viewing the player A's notification on a bulletin board or an SNS (social network service) on the Internet, and can input that competition ID in the competition-ID input region 801, as shown in FIG. 14.

When the player B performs an input by touching the search execution button 801 while the competition search screen 800 is being displayed (step S116), the control unit 41 transmits, to the server 20, a competition-ID search request including the content input in the competition-ID input region 801 (step S117).

At the server 20, upon receiving the competition-ID search request from the player terminal 40, the control unit 21 makes a search to see whether the competition record corresponding to the competition ID included in the received competition-ID search request exists in the storage unit 22 (step S211) and transmits a search completion response according to the search result to the player terminal 40 of the player B (step S212).

If the competition record corresponding to the competition ID included in the competition-ID search request exists, the control unit 21 transmits, to the player terminal 40 of the player B, a search completion response including competition information, such as the "organizer ID", "game format", "format", "upper limit number of players", "number of participants", "competition holding period", and "watch setting".

Figure 15:
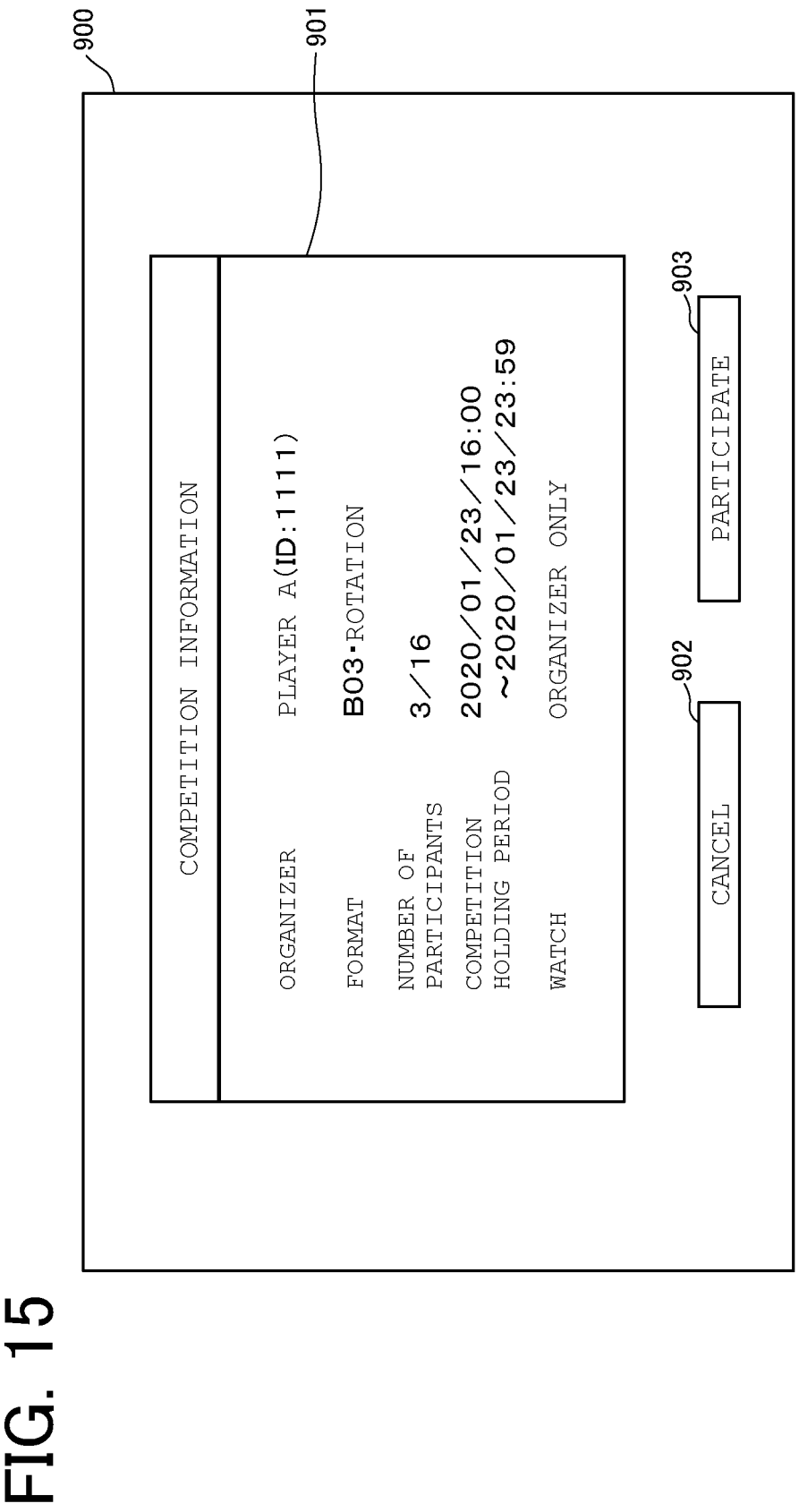
FIG. 15 is a diagram showing an example of a competition participation confirmation screen displayed on the player terminal.

At the player terminal 40, in the case where the control unit 41 receives the search completion response including competition information (Y in step S117), the control unit 41 displays a competition participation confirmation screen 900 shown in FIG. 15 on the display unit 44 (step S118). On the competition participation confirmation screen 900, the content based on the competition information included in the search completion response is displayed in a display region 901. In addition, a cancel button 902 and a participation determination button 903 are provided on the competition participation confirmation screen 900. In the case where the player B performs an input by touching the participation determination button 903 while the competition participation confirmation screen 900 is being displayed (Y in step S120), the control unit 41 transmits, to the server 20, a participant registration request including the player ID of the player B (step S121). Note that in the case where the player B performs an input by touching the cancel button 902 while the competition participation confirmation screen 900 is being displayed (N in step S120), the control unit 41 displays the competition search screen 800 on the display unit 44.

At the server 20, upon receiving the participant registration request from the player terminal 40, the control unit 21 updates the competition record of the "user competition" organized by the player A by additionally registering, as a participant, the player corresponding to the player ID included in the participant registration request (step S213) and reports that registration of the player B as a participant in the "user competition" organized by the player A has been completed by transmitting a registration completion response to the player terminal of the player B (step S214). Although not shown in the figure, upon receiving a participant registration request, if the control unit 21 cannot register the requesting player as a participant for reasons such as because the number of participants reaches the upper limit number or because the start time has passed, as a result of referring to the competition record of the "user competition", the control unit 21 responds with an error to the player terminal 40 that has transmitted the participant registration request.

In addition, in the case where the competition record corresponding to the competition ID included in the competition-ID search request does not exist, the control unit 21 transmits, to the player terminal 40 of the player B, a search completion response including search error information for reporting that the applicable user competition does not exist. For example, a search error would result if "123457" were input mistakenly as the competition ID when "123456" should be input. Note that a "user competition" including the same number of participants as the upper limit number may be excluded from user competitions to be searched for. By doing so, when the server 20 receives a competition-ID search request for the real competition ID, the server 20 can transmit, to the player terminal 40, a search completion response including search error information.

Figure 16:
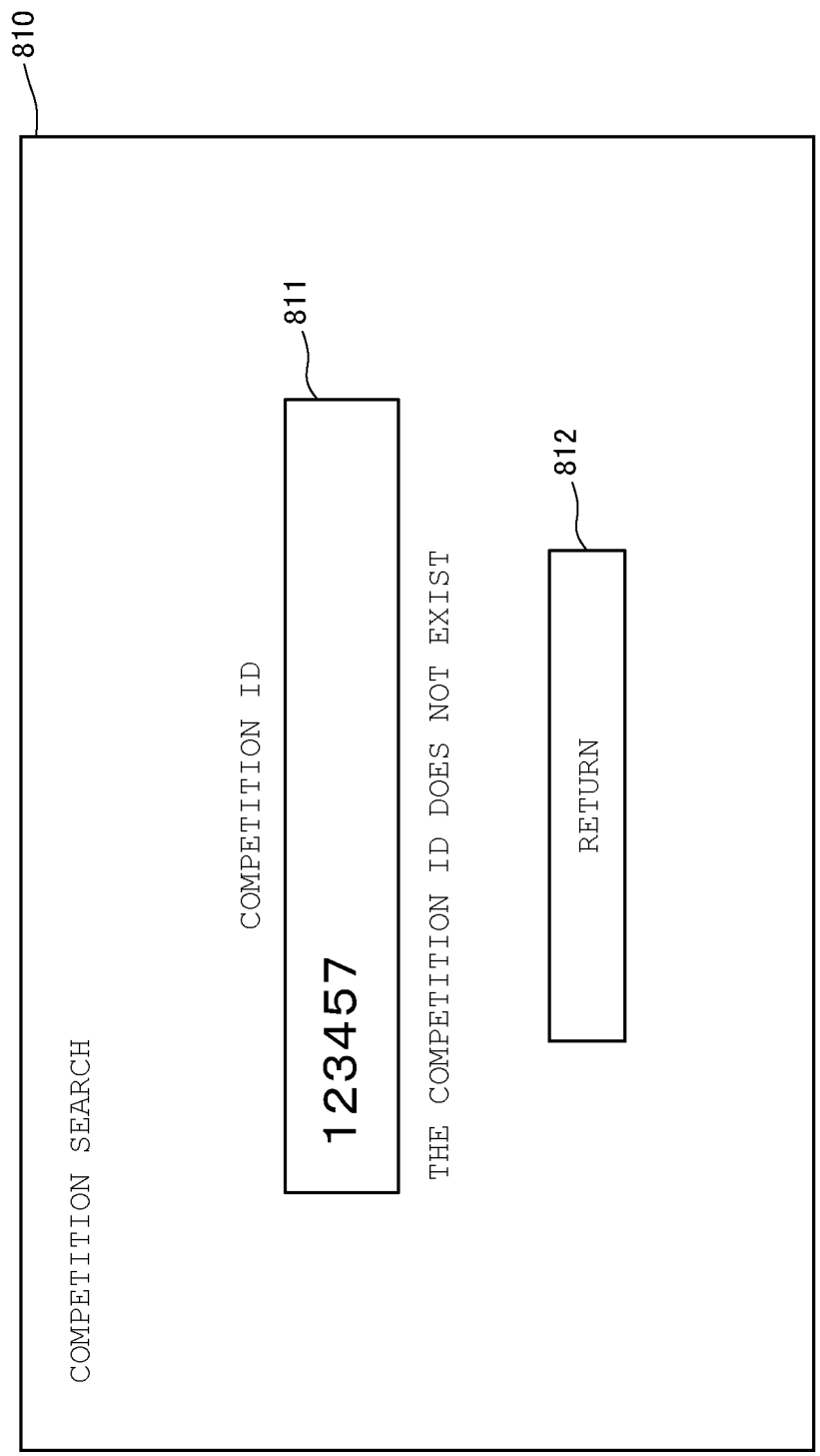
FIG. 16 is a diagram showing an example of a search error screen displayed on the player terminal.

At the player terminal 40, in the case where the control unit 41 has received the search completion response including search error information (N in step S117), the control unit 41 displays a search error screen 810 shown in FIG. 16 on the display unit 44 (step S119). A return button 811 is provided on the search error screen 810, and when the player B performs an input by touching the return button 811, the control unit 41 displays the competition search screen 800 on the display unit 44.

Figure 17:
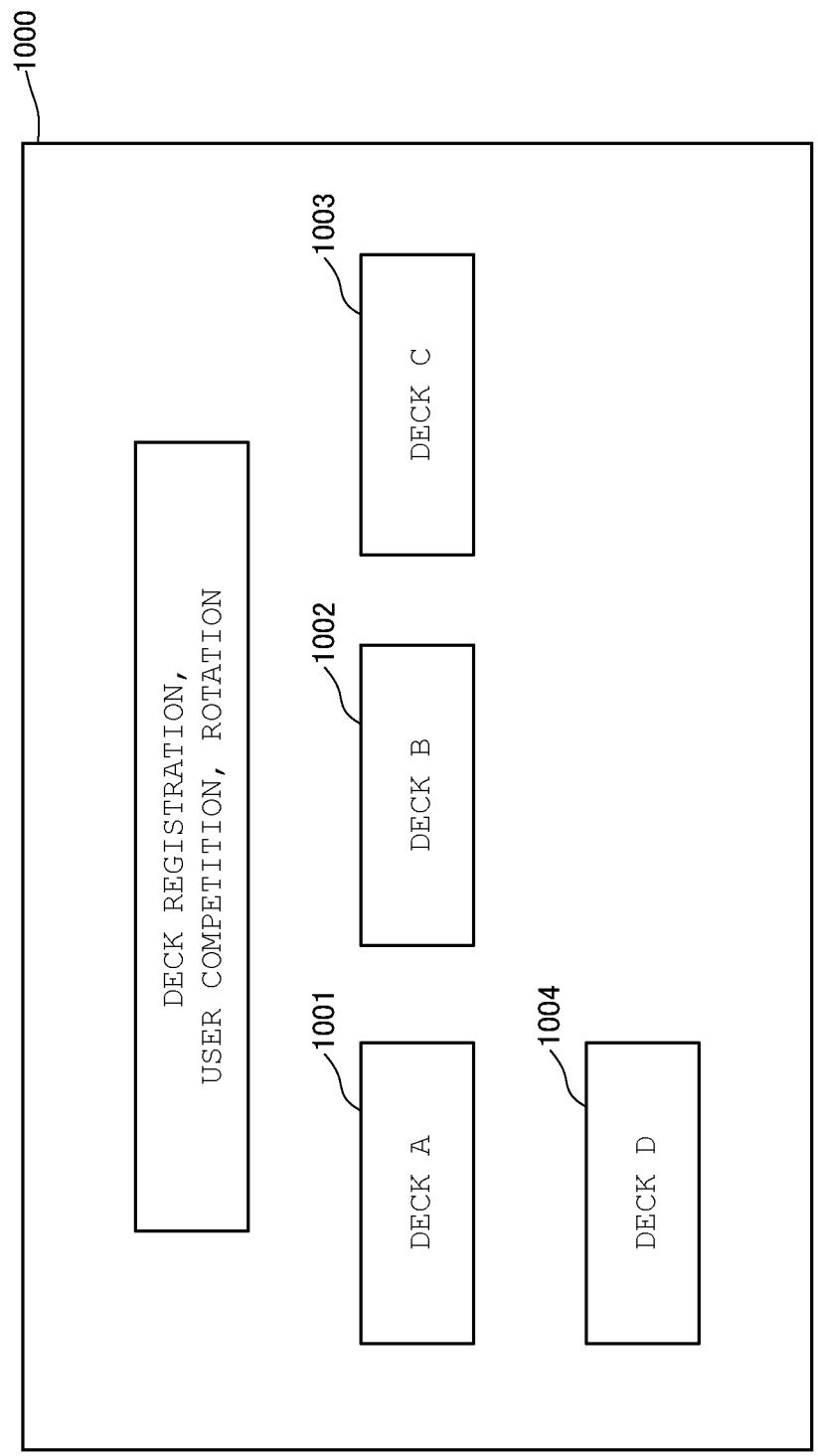
FIG. 17 is a diagram showing an example of a deck registration screen displayed on the player terminal.

In addition, in this embodiment, a player participating in a "user competition" needs to register a card deck used in a battle after completing registration of himself/herself as a participant. A deck registration screen 1000 shown in FIG. 17 is an example of a user interface for registering a card deck used in the "user competition". The control unit 41 may display the deck registration screen 1000 on the display unit 44 on the basis of the completion of registration as a participant in the "user competition" or may display the deck registration screen 1000 on the display unit 44 when the player registered as a participant performs a predetermined input at any timing no later than the start time of the "user competition" in which the player has been registered as a participant.

In the example shown in FIG. 17, a deck A, a deck B, a deck C, and a deck D are prepared by the player as card decks corresponding to the "rotation" format, and a deck selection button 1001 for selecting the deck A, a deck selection button 1002 for selecting the deck B, a deck selection button 1003 for selecting the deck C, and a deck selection button 1004 for selecting the deck D are provided on the deck registration screen 1000. By performing an input by touching one of the deck selection buttons, the player participating in the "user competition" can select a card deck used in the "user competition".

Figure 18:
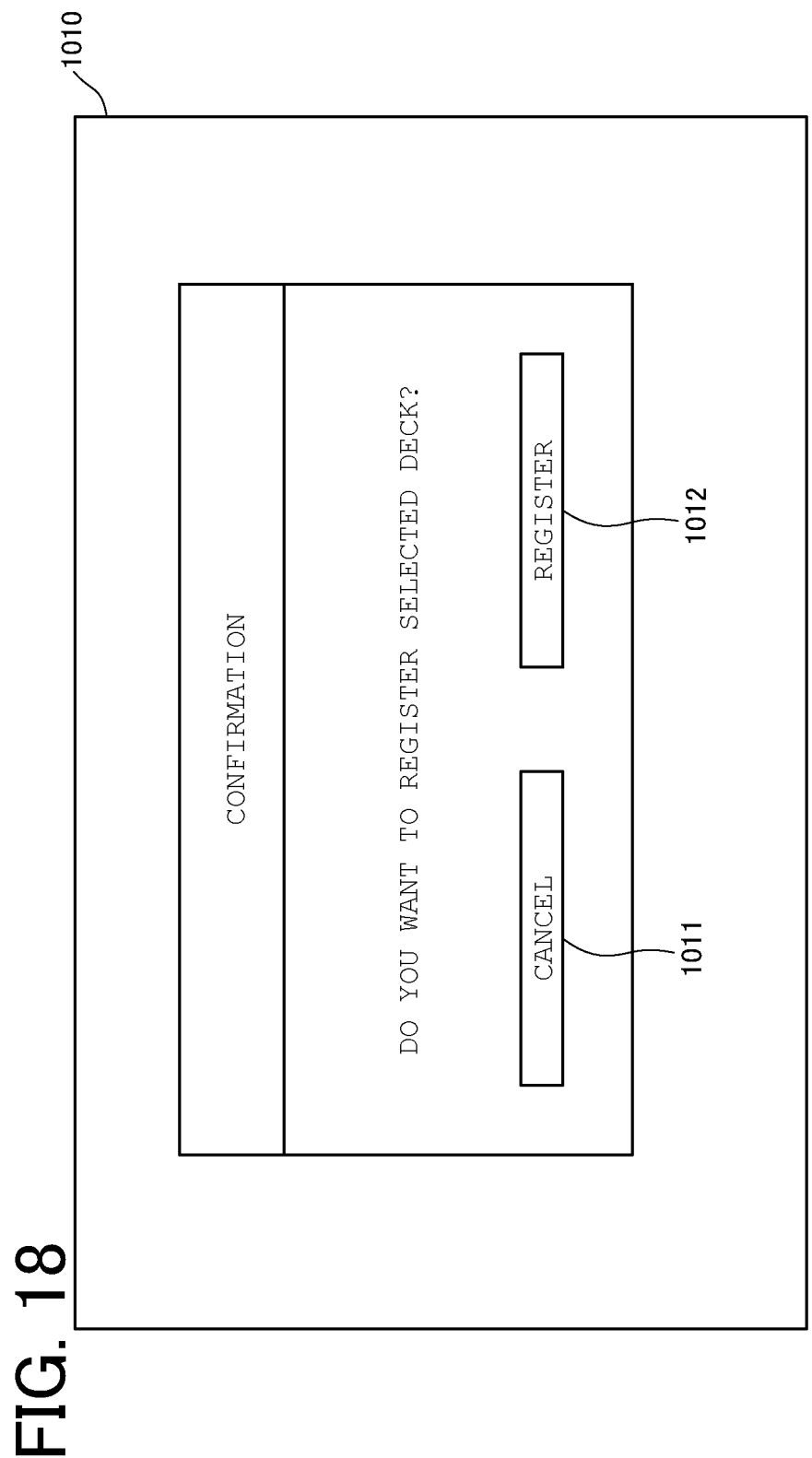
FIG. 18 is a diagram showing an example of a registration confirmation screen displayed on the player terminal.

When the player performs an input by touching one of the deck selection buttons while the deck registration screen 1000 is being displayed, the control unit 41 of the player terminal 40 displays a registration confirmation screen 1010 shown in FIG. 18 on the display unit 44. A message asking for confirmation of registration is displayed on the registration confirmation screen 1010, and a cancel button 1011 and a registration button 1012 are provided.

In the case where the player performs an input by touching the registration button 1012 while the registration confirmation screen 1010 is being displayed, the control unit 41 transmits, to the server 20, a deck registration request including the competition ID of the "user competition" for which the selected deck is to be registered, the player ID of the player who performs deck registration, and information concerning the selected card deck. At the server 20, upon receiving the deck registration request, the control unit 21 updates the competition record corresponding to the competition ID included in the deck registration request by registering the information concerning the card deck in the competition record in association with the player ID. Note that in the case where the player performs an input by touching the cancel button 1011 while the registration confirmation screen 1010 is being displayed, the control unit 41 displays the deck registration screen 1000 on the display unit 44 without transmitting a deck registration request.

Figure 19:
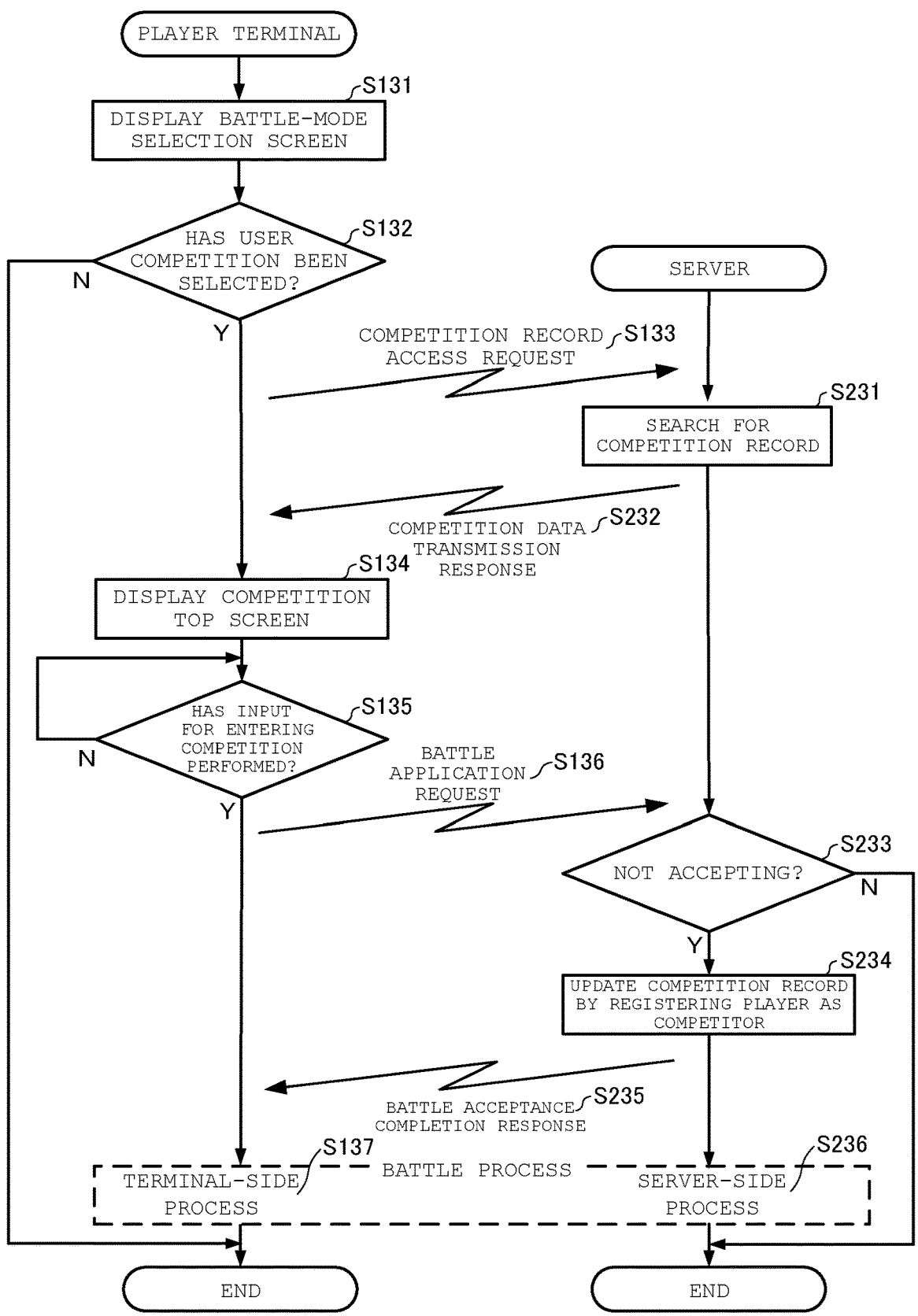
FIG. 19 is a flowchart showing an example of processing executed in the information processing system.

FIG. 19 is a flowchart showing an example of processing in the server 20 and the player terminal 40, i.e., the processing that is executed until players are made to fight a battle against each other while the "user competition" organized by the player A is being held. The following description assumes that the player B registered as a participant in a "user competition" organized by the player A gives a battle invitation by using the user interface of the competition top screen 500 shown in FIG. 9 and a player C, who is also registered as a participant in the "user competition" organized by the player A, challenges the player B to a battle.

First, at the player terminal 40 of the player C, the control unit 41 starts the game program stored in the storage unit 42, and displays the battle-mode selection screen 700 shown in FIG. 11 on the display unit 44 when the player C performs a predetermined input (step S131). On the battle-mode selection screen 700, the countdown image 702 indicating the time remaining until the end time of the "user competition" in which the player C is registered as a participant is superimposed onto the icon image 701 for "user competition".

In the case where the player C performs an input by touching the icon image 701 for "user competition" while the battle-mode selection screen 700 is being displayed (Y in step S132), the control unit 41 of the player terminal 40 transmits, to the server 20, a competition record access request including the competition ID of the "user competition" and the player ID of the player C in order to acquire information stored in the competition record of the "user competition" in which the player C is registered as a participant (step S133). Note that in the case where the player C performs an input by touching the icon image for "free battle" while the battle-mode selection screen 700 is being displayed (N in step S132), this processing ends, and processing related to "free battle" is executed.

At the server 20, upon receiving the competition record access request from the player terminal 40, the control unit 21 makes a search for a competition record on the basis of the competition ID included in the competition record access request (step S231) and transmits, to the player terminal of the player C corresponding to the player ID included in the competition record access request, a competition data transmission response including information stored in the competition record of the "user competition" organized by the player A (step S232).

Figure 20:
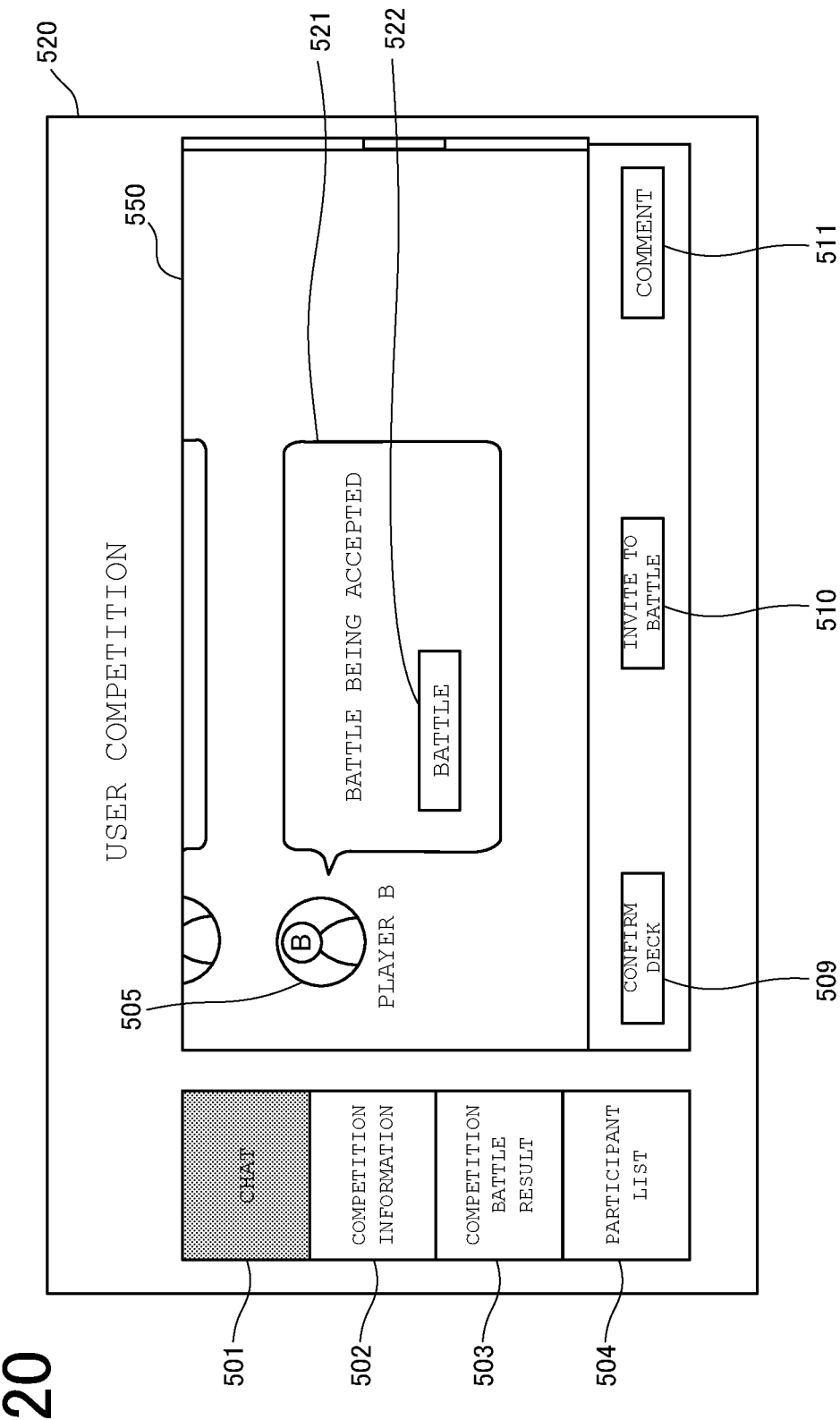
FIG. 20 is a diagram showing an example of the competition top screen displayed on the player terminal.

At the player terminal 40 that has received the competition data transmission response from the server 20, the control unit 41 displays, on the display unit 44, a competition top screen 520 shown in FIG. 20 (step S134).

On the competition top screen 520 shown in FIG. 20, a comment 521 indicating that the player B is accepting a battle is displayed, and a battle application button 522 is provided on the comment 521. In this embodiment, when a battle ID is generated, the comment 521 with the battle application button 522 is posted.

More specifically, when a player registered as a participant in a "user competition" performs an input by touching the battle invitation button provided below the comment display region, the control unit 41 of the player terminal 40 transmits a battle ID generation request to the server 20. At the server 20 that has received the battle ID generation request, the control unit 21 issues a battle ID in association with the player ID of the player who has given the battle invitation and stores the battle ID in the competition record.

In the competition record, battle status information is associated with the battle ID, and the battle status information is set to "accepting" at the stage in which the battle ID is generated. Then, when a battle between the player B and another player is started, the battle status information associated with the battle ID changes to "battle in progress". When the battle ends, the battle status information associated with the battle ID changes to "battle is over".

In other words, on the competition top screen 520, as a result of the player B performing an input by touching the aforementioned battle invitation button, the comment 521 with the battle application button 522 linked with the battle ID issued in response to the battle invitation given by the player B is displayed on the display unit 44 of the player terminal 40 of the player C.

Figure 21:
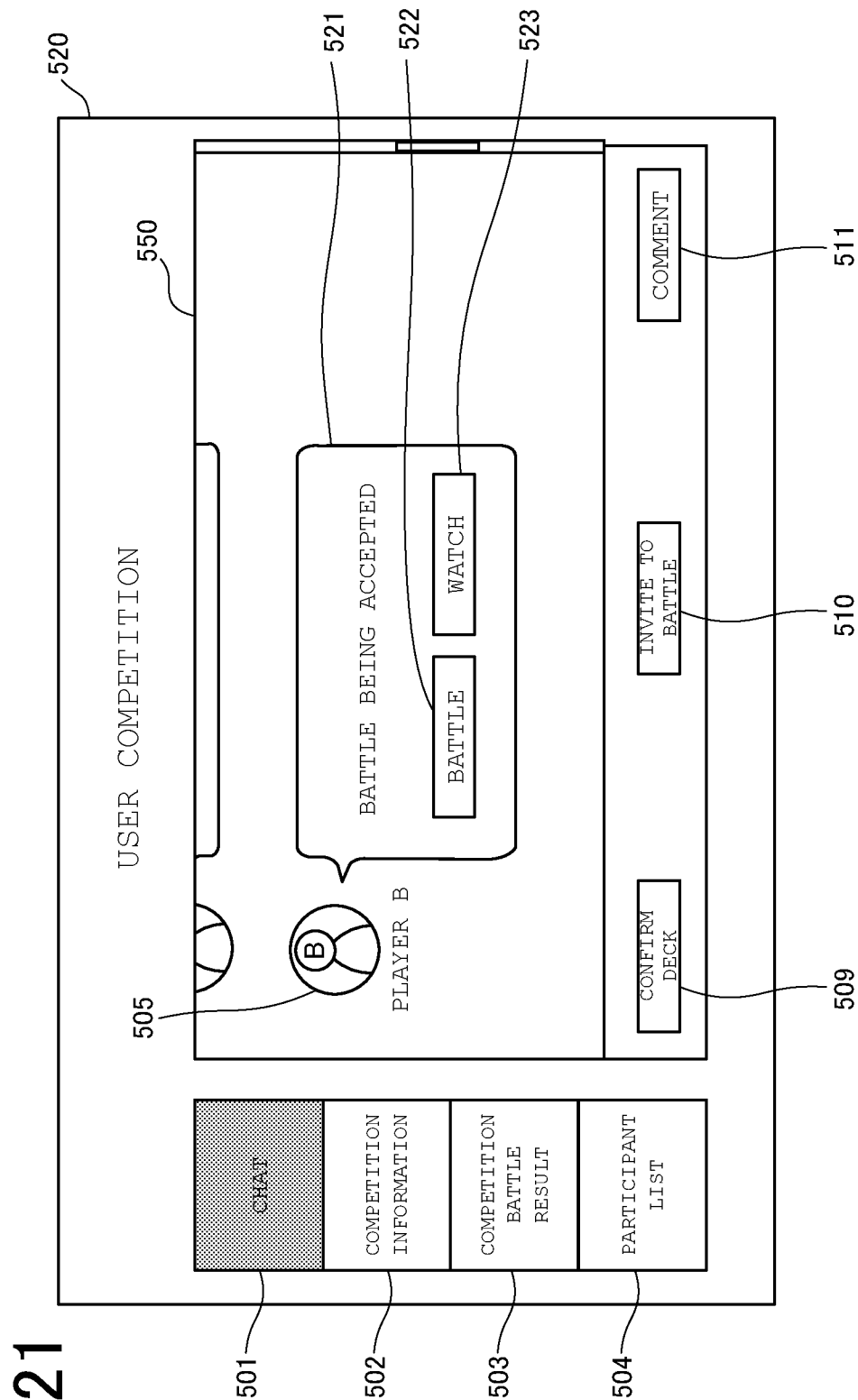
FIG. 21 is a diagram showing an example of the competition top screen displayed on the player terminal.

Because the watch setting is set to "organizer only" in the "user competition" organized by the player A, the comment 521 on the competition top screen 520 is provided with only the battle application button 522 on the player terminal 40 of a player registered as a participant. If the watch setting were set to "organizer and participants", however, the comment 521 on the competition top screen 520 would be provided with not only the battle application button 522 but also a watch application button 523, as shown in FIG. 21.

In the case where the player C performs an input by touching the battle application button 522 while the competition top screen 520 is being displayed (Yin step S135), the control unit 41 of the player terminal 40 transmits, to the server 20, a battle application request including the competition ID of the "user competition" in which the player C is registered as a participant and the battle ID issued in response to the battle invitation given by the player B (step S136).

At the server 20, upon receiving the battle application request from the player terminal 40, the control unit 21 refers to the competition record on the basis of the competition ID and the battle ID included in the received battle application request and determines whether or not the battle status information associated with the battle ID is set to "accepting" (step S233).

In the case where the battle status information associated with the battle ID included in the battle application request is set to "accepting" (N in step S233), the control unit 21 updates the competition record by registering, in the competition record based on the competition ID included in the battle application request, the player C as a competitor in the battle corresponding to the battle ID (step S234). At this time, the battle status information associated with the battle ID is also changed from "accepting" to "battle in progress". In addition, the control unit 21 transmits, to the player terminal 40 of the player C, a battle acceptance completion response reporting that the application for a battle made by the player C based on the battle application request has been accepted (step S235). Although not shown in the figure, if the battle status information associated with the battle ID included in the battle application request is not set to "accepting" (Y in step S233), the control unit 21 transmits, to the player terminal 40, a battle application error response reporting that the application for a battle cannot be accepted and ends this processing.

Then, when the application for a battle made by the player C is accepted in response to the battle invitation given by the player B, a battle process for fighting a battle in the form of a card game is executed, wherein the control unit 41 of the player terminal 40 of the player B and the control unit 41 of the player terminal 40 of the player C mutually exchange input information, card information, etc. via the server 20 (terminal-side process: step S137, server-side process: step S236).

At the player terminal 40 of the player B, the control unit 41 executes, as terminal-side processes: the process of transmitting input information, card information, etc. of the player B to the server 20; the process of acquiring input information, card information, etc. of the player C from the server 20; the process of executing game computations based on input information, card information, etc. of each of the players and, on the basis of the results of computations, generating an image related to the in-battle game screen; etc.

At the player terminal 40 of the player C, the control unit 41 executes, as terminal-side processes: the process of transmitting input information, card information, etc. of the player C to the server 20; the process of acquiring input information, card information, etc. of the player B from the server 20; the process of executing game computations based on input information and card information of each of the players and, on the basis of the results of computations, generating an image related to the in-battle game screen; etc.

At the server 20, the control unit 21 executes, as server-side processes: the process of transmitting, to the player terminal 40 of the player C, input information, card information, etc. received from the player terminal 40 of the player B; the process of transmitting, to the player terminal 40 of the player B, input information, card information, etc. received from the player terminal 40 of the player C; the process of managing the progress of the battle; etc.

Figure 22:
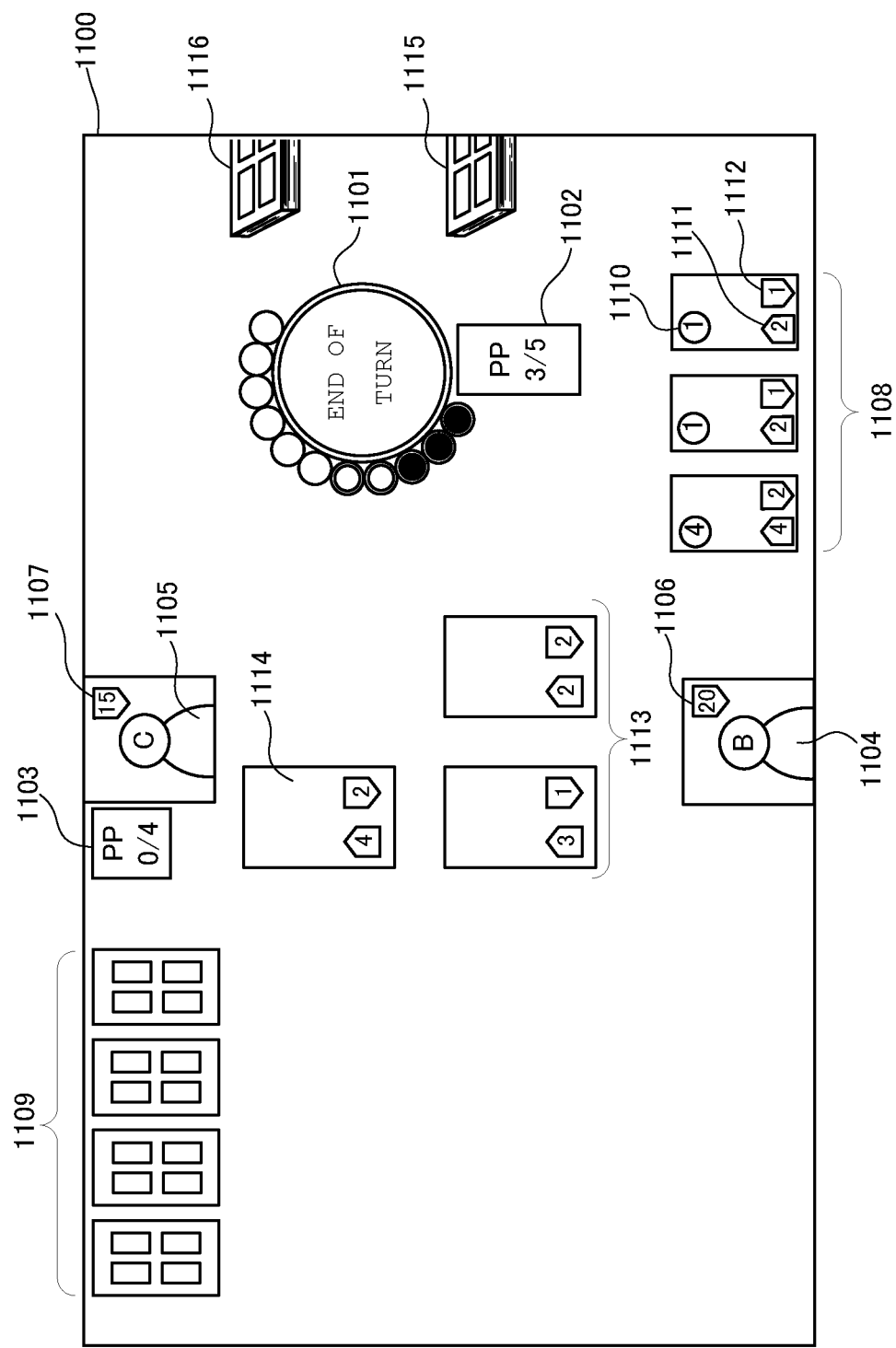
FIG. 22 is a diagram showing an example of an in-battle game screen displayed on the player terminal.

FIG. 22 is an example of an in-battle game screen 1100 that is displayed on the display unit 44 of the player terminal 40 of the player B during the battle between the player B and the player C.

The in-battle game screen 1100 is provided with an end-of-turn button 1101 for declaring the end of the player B's turn. When the player B performs an input by touching the end-of-turn button 1101, the player B's turn ends, and the turn of the player C, serving as the opponent, starts.

A play point indication 1102 indicating the play points (PP) of the player B and a play point indication 1103 indicating the play points (PP) of the player C are provided on the in-battle game screen 1100. These play point indications represent play points at the time each player's turn is started, as well as remaining play points available. For example, "3/5" on the player point indication 1102 means that the play points (PP) at the time the turn is started are 5 points and the remaining play points that are available are 3 points.

A character icon 1104 for the player B and a character icon 1105 for the player C are displayed on the in-battle game screen 1100. Numeric characters displayed in the character icon 1104 represent a player life indication 1106 for the player B, and numeric characters displayed in the character icon 1105 represent a player life indication 1107 for the player C. These player lives are elements for determining winning or losing in the card game, and a player can win the card game by reducing the player life of the opponent to 0.

Hand cards 1108 of the player B are displayed on the right of the character icon 1104 for the player B, and hand cards 1109 of the player C are displayed on the left of the character icon 1105 for the player C. Because the in-battle game screen 1100 is a screen that is displayed on the display unit 44 of the player terminal 40 of the player B, card information concerning the hand cards 1108 of the player B is displayed, but the card information concerning the hand cards 1109 of the player C is not displayed. Card information, such as a card name (not shown in the figure), a card pattern (not shown in the figure), a cost indication 1110, an attacking power indication 1111, and a card life indication 1112, is displayed on each of the hand cards 1108 of the player B. The hand cards 1109 of the player C are subjected to card skin display, showing a design common to the card deck used by the player C. Note that the hand cards of the opponent are identified as follows. The server 20 transmits dummy card information for the cards serving as hand cards, and a player terminal 40 that has received the dummy card information refers to the card information database in the storage unit 42.

When the player B's turn is started, one card is added to the hand cards 1108 of the player B from a stock pile card 1115, which includes unused cards in the card deck of the player B. When the player C's turn is started, one card is added to the hand cards 1109 of the player C from a stock pile card 1116, which includes unused cards in the card deck of the player C.

In addition, field cards 1113 of the player B and a field card 1114 of the player C are displayed on the in-battle game screen 1100. Each of the players can turn a hand card into a field card within the range of cost available in his/her own turn and can reduce, according to the numerical value of attacking power of the field card, the card life of a field card of the opponent or the player life of the opponent. When the card life of the field card is 0, the field card leaves the field. In addition, as described above, when the player life of either one of the players is 0, the other player wins.

Thus, on the in-battle game screen 1100, the player B cannot know card information concerning the hand cards 1109 of the player C, but the player B can know card information concerning the field card 1114 that has been turned from a hand card 1109.

Figure 23:
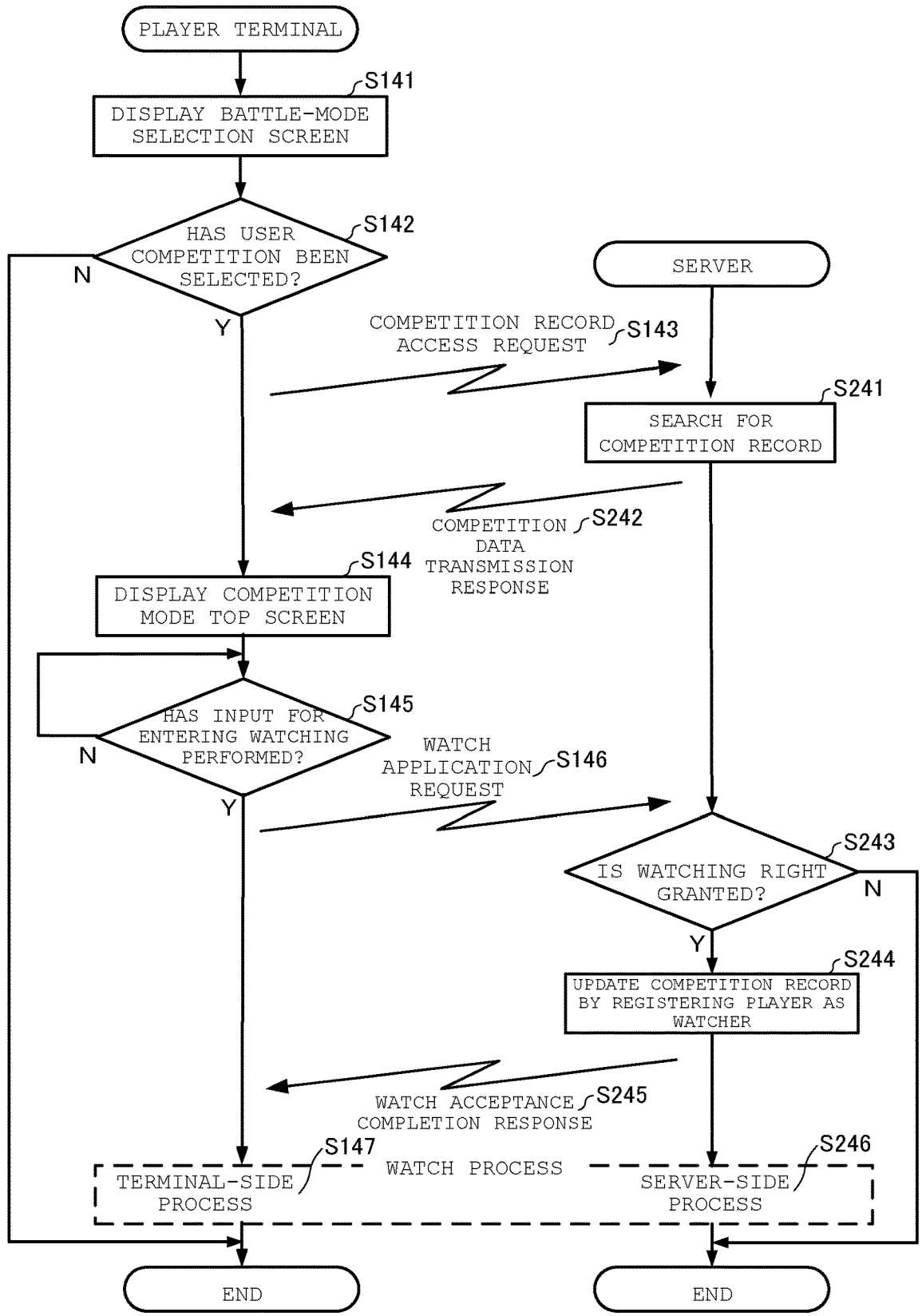
FIG. 23 is a flowchart showing an example of processing executed in the information processing system.

FIG. 23 is a flowchart showing an example of processing in the server 20 and the player terminal 40, i.e., the processing that is executed until watching of a battle between players is allowed while a "user competition" organized by the player A is being held. The following description assumes that the player A registered as an organizer of a "user competition" watches a battle between the player B and the player C registered as participants in the "user competition" organized by the player A.

First, at the player terminal 40 of the player A, the control unit 41 starts the game program stored in the storage unit 42, and displays the battle-mode selection screen 700 shown in FIG. 11 on the display unit 44 when the player A performs a predetermined input (step S141). On the battle-mode selection screen 700, the countdown image 702 indicating the time remaining until the end time of the "user competition" in which the player A is registered as a participant is superimposed onto the icon image 701 for "user competition".

In the case where the player A performs an input by touching the icon image 701 for "user competition" while the battle-mode selection screen 700 is being displayed (Y in step S142), the control unit 41 of the player terminal 40 transmits, to the server 20, a competition record access request including the competition ID of the "user competition" and the player ID of the player A in order to acquire information stored in the competition record of the "user competition" in which the player A is registered as an organizer (step S143). Note that in the case where the player A performs an input by touching the icon image for "free battle" while the battle-mode selection screen 700 is being displayed (N in step S142), this processing ends, and processing related to "free battle" is executed.

At the server 20, upon receiving the competition record access request from the player terminal 40, the control unit 21 makes a search for a competition record on the basis of the competition ID included in the competition record access request (step S241) and transmits, to the player terminal of the player A corresponding to the player ID included in the competition record access request, a competition data transmission response including information stored in the competition record of the "user competition" organized by the player A (step S242).

Figure 24:
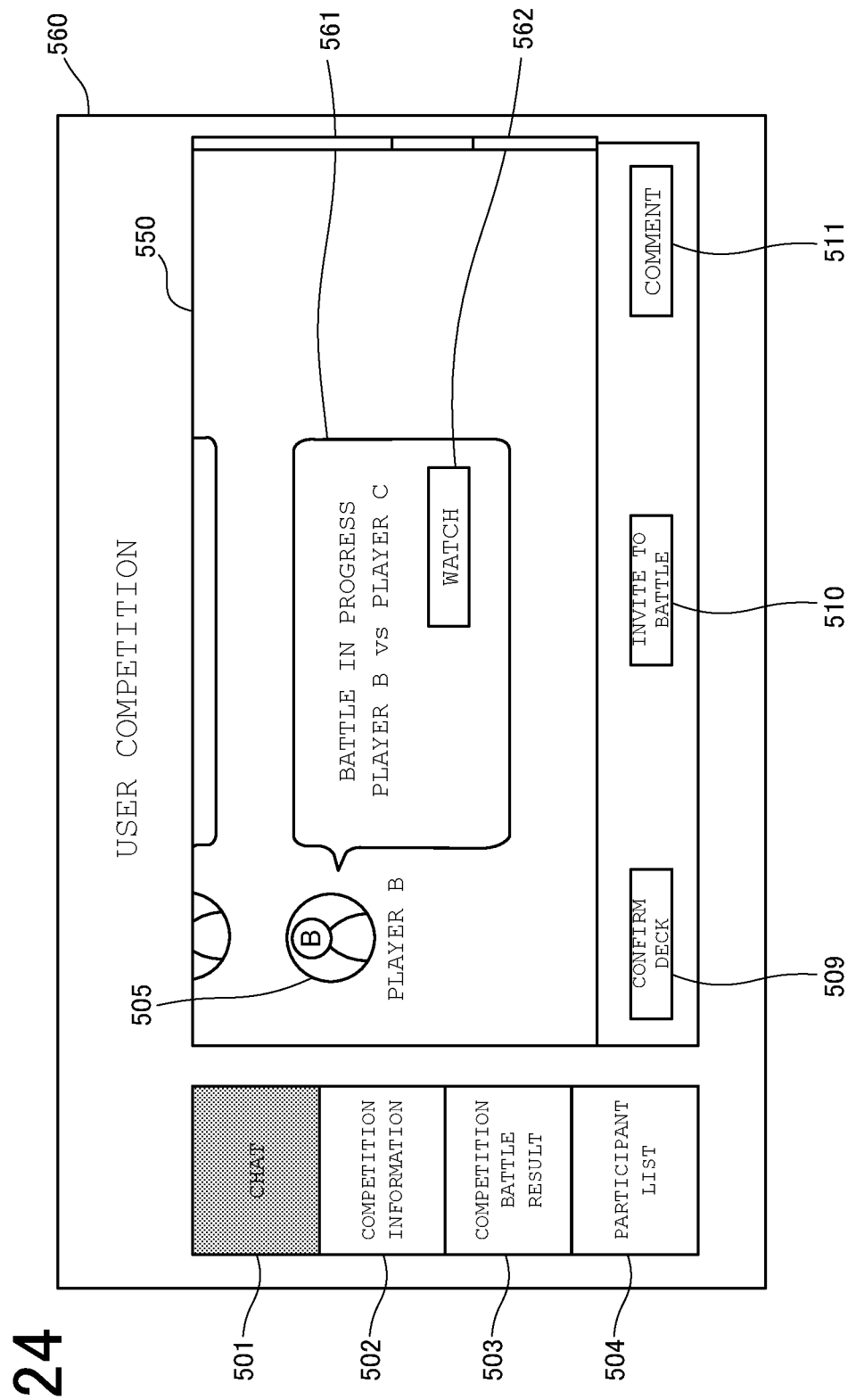
FIG. 24 is a diagram showing an example of the competition top screen displayed on the player terminal.

At the player terminal 40 that has received the competition data transmission response from the server 20, the control unit 41 displays, on the display unit 44, a competition top screen 560 shown in FIG. 24 (step S134).

On the competition top screen 560 shown in FIG. 24, a comment 561 indicating that the player B and the player C are fighting a battle is displayed, and a watch application button 562 is provided on the comment 561. In this embodiment, the watch application button 562 is displayed only on the player terminals 40 of players, among the players registered as the organizer of or participants in the "user competition", who have a watching right set in the "watch setting". In this embodiment, the player A can make a watch application on his/her own player terminal 40 because the "watch setting" is set to "organizer only". However, the watch application button 562 cannot be displayed on, for example, the player terminal 40 of a player D, who is a player registered as a participant but is different from the player B and player C fighting the battle, and thus the player D cannot make a watch application.

In the case where the player A performs an input by touching the watch application button 562 while the competition top screen 560 is being displayed (Yin step S145), the control unit 41 of the player terminal 40 transmits, to the server 20, a watch application request including the player A's own player ID, the competition ID of the "user competition", and the battle ID related to the battle between the player B and the player C (battle ID generated at the time the battle invitation was given) (step S146).

At the server 20, upon receiving the watch application request from the player terminal 40, the control unit 21 refers to the competition record on the basis of the competition ID included in the received watch application request and determines whether or not the player ID included in the watch application request belongs to a player having a watching right (step S243). Because the "watch setting" for this "user competition" is set to "organizer only" and the player A is registered as the "organizer", it is determined that the player ID included in the watch application request transmitted from the player terminal 40 of the player A is the player ID of a player having a watching right.

In the case where the player ID included in the watch application request indicates a player having a watching right (Y in step S243), the control unit 21 updates the competition record by registering, in the competition record based on the competition ID included in the watch application request, the player ID included in the watch application request as a watcher of the battle corresponding to the battle ID included in the watch application request (step S244). In addition, the control unit 21 transmits, to the player terminal 40 of the player A, a watch acceptance completion response reporting that acceptance of the watch application made by the player A based on the watch application request has been completed (step S245). Although not shown in the figure, if the player corresponding to the player ID included in the watch application request is not a player having a watching right (N in step S243), the control unit 21 transmits, to the player terminal 40, a watch application error response reporting that the watch application cannot be accepted and ends this processing.

Then, when registration as a watcher of the battle between the player B and the player C is accepted, the control unit 41 of the player terminal 40 of the player A executes a watch process for enabling watching of the battle by acquiring, via the server 20, the input information and card information of the player B and the input information and card information of the player C (terminal-side process: step S147, server-side process: step S246).

At the player terminal 40 of the player A, the control unit 41 executes, as terminal-side processes: the process of acquiring, from the server 20, input information, card information, etc. of the player B and the player C; the process of executing game computations based on input information, card information, etc. of each of the players and, on the basis of the results of computations, generating an image related to the watch screen; etc.

At the server 20, the control unit 21 executes, as server-side processes: the process of transmitting, to the player terminal 40 of the player A, input information and card information received from the player terminal 40 of the player B; the process of transmitting, to the player terminal 40 of the player A, input information and card information received from the player terminal 40 of the player C; the process of managing the progress of the battle; etc.

Figure 25:
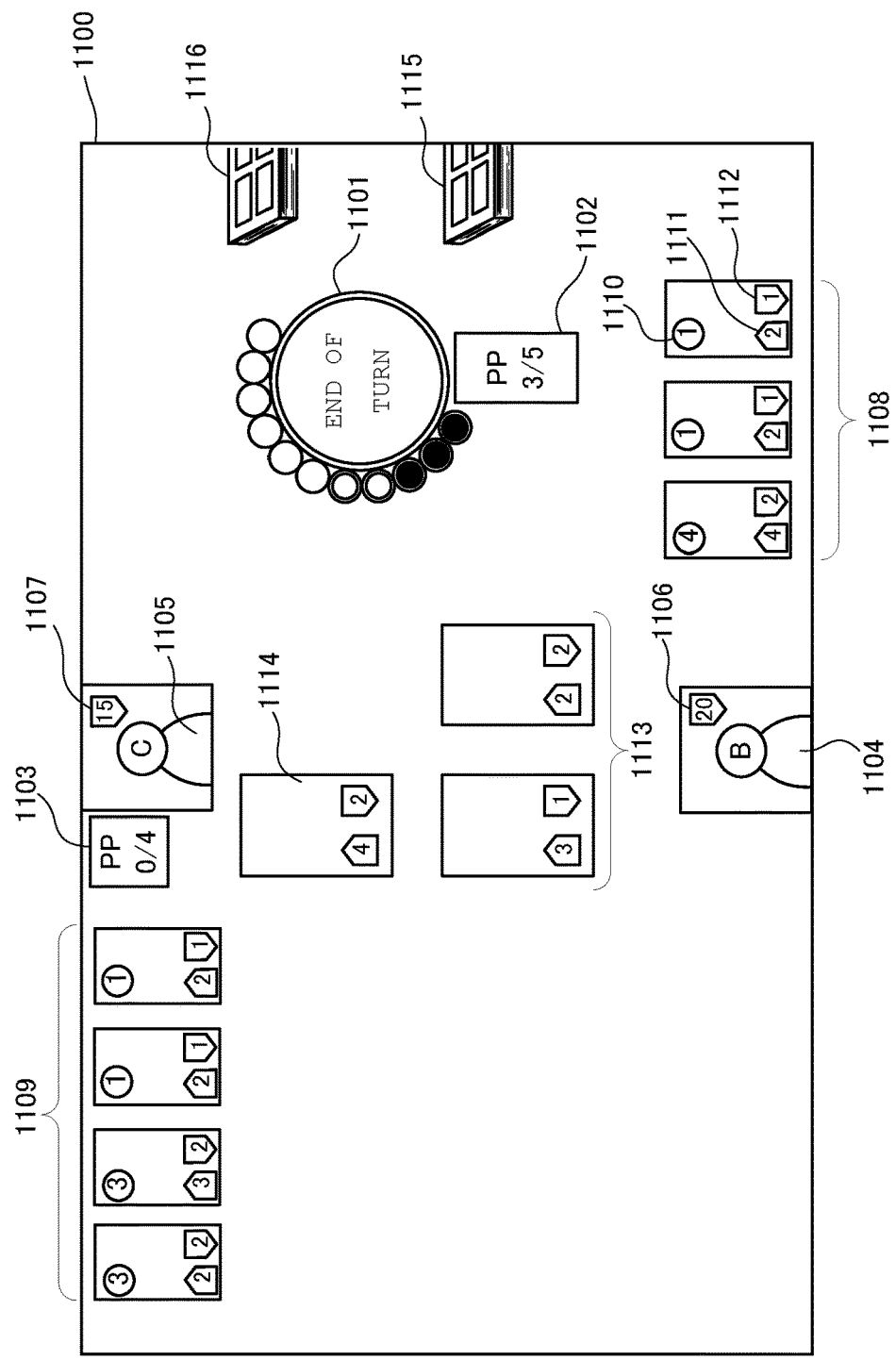
FIG. 25 is a diagram showing an example of a watch screen displayed on the player terminal.

FIG. 25 is a watch screen 1200 displayed on the display unit 44 of the player terminal 40 of the player A watching the battle between the player B and the player C.

The watch screen 1200 is a screen as viewed from the player who has given a battle invitation related to the generation of the battle ID and is the same as the in-battle game screen 1100 in that it is a screen as viewed from the player B in the battle between the player B and the player C. However, the watch screen 1200 differs from the in-battle game screen 1100 in that card information concerning the hand cards 1109 of the player C is displayed. In particular, in this embodiment, the provision of the watching function differs from the provision of the battle function in that when the watching function is provided, the server 20 transmits regular card information concerning the hand cards and field cards of both players fighting the battle, and consequently an image related to the watch screen is generated so as to disclose, on the player terminal 40 of the watcher, the hand cards and field cards of each of the players fighting the battle on the basis of the received regular card information.

Thus, on the watch screen 1200, the player A serving as a watcher can watch the battle in a state in which the player A can know card information concerning the hand cards and field cards of both the player B and the player C.

The information processing system 10 described above allows a watching right to be set such that a battle between players belonging to the battle group formed for a "user competition" can be watched through the terminal of the player registered as the organizer, whereas a player who is neither the organizer nor the players fighting the battle cannot watch the battle on his/her terminal. This allows the organizer to properly manage the battle group while still maintaining fairness between the players and therefore can enhance an interface environment related to a game in which players fight a battle against each other.

In particular, if a participant is allowed to watch a game that is played in the form of a battle with information concerning some cards being not disclosed, as in the card game realized by the information processing system 10, then the participant can know the contents of a card deck and battle tactics of other participants before starting a battle. This works as a factor compromising the fairness between players. Therefore, the present invention is suitable for enabling the setting of a watching right that allows only an organizer to watch the game.

In addition, the information processing system 10 can also be used for not only card games but also games that allow players to fight a battle against each other, wherein an organizer is allowed to serve as a supervisor who can discover illegal acts during a battle and breach of game etiquette, such as abandoning the game during a battle.

In addition, the information processing system 10 can also be used in such a manner that a participant who fights a battle is disabled from watching a battle to ensure fairness, but only the organizer is granted a watching right so that the organizer can distribute the watch screen of the organizer's own player terminal 40 via the Internet for the purpose of enabling third persons to watch the battle.

In addition, because the information processing system 10 also allows the selection of a watching right for enabling players registered as participants to watch a battle, the organizer can manage the battle group according to the taste of the "user competition".

In particular, in a game that is played in the form of a battle with information concerning some cards being not disclosed, as in the card game realized by the information processing system 10, a player can watch the game by seeing, through his/her watch screen, card information that is not disclosed to the competitors. Therefore, by allowing the setting of a watching right for enabling players registered as participants to watch the game, the information processing system 10 can also be used to give an opportunity for participants to study battle tactics.

3. Modifications

Matching of players for a battle between players may be realized not only by sending an application in response to a battle invitation but also by randomly matching players in the battle group.

In addition, "players" are not limited to real players but include computer players and non-player characters (NPC) who behave in accordance with a predetermined algorithm. For example, if no application for a battle is made after a certain time period since the start of a battle invitation, a battle may be started with a computer player or a non-player character (NPC) as an opponent.

In addition, battles between players need not be independent of each other but may be held in a tournament format. Matching of players in the case of a tournament format may be realized by determining players by lottery in the server 20 or may be realized, for example, such that the organizer manually inputs a matched pair of players in the player terminal 40 and transmits the input content to the server 20 to register the matched players in the competition record. In addition, in the case where a tournament format is employed, the present invention may be configured to be capable of selecting whether or not to set a seed, and if matching is not possible due to the number of participants in the tournament with no seeds being set, a computer player or a non-player character (NPC) may be replenished as an opponent.

In addition, although the present invention is configured not to display a watch button used to make a watch application on the player terminal 40 of a player not having a watching right, it may be possible to display a watch button, regardless of whether or not the player has a watching right. In this case, the present invention may be configured such that when a watch application request is transmitted to the server 20 as a result of the player, who has no watching right, performing an input on the watch button on his/her player terminal 40, the server 20 that has received the watch application request can respond with an error because the player has no watching right. In addition, the present invention may be configured so as to be capable of displaying a watch button on the player terminal 40 of a player having no watching right but to execute processing for not accepting an input on the watch button and grey out the watch button, thereby informing the player that the watch button is disabled.

In addition, the server 20 may be provided as two separate servers, one for providing the battle function and the other for providing the watching function. By doing so, even when the number of watchers increases, the communication traffic can be distributed, whereby adverse effects on the provision of the battle function can be mitigated. This configuration is effective particularly when the watching function is provided for a game in which a server response delay has a significant impact on the outcome of the game, such as a battle game and a sports game.

In addition, although the watch screen is a screen as viewed from the player giving a battle invitation, the present invention may be provided with a viewpoint change function for switching to a watch screen as viewed from the opponent in response to an input from the player terminal 40 of a watcher. In the case where the viewpoint change function for switching the watch screen is provided, an input for switching the viewpoint may be enabled (e.g., by providing a watch application button from the player B's viewpoint and a watch application button from the player C's viewpoint) at the time a watch application is made, or alternatively, the watch screen may be provided with a viewpoint change button so that the viewpoint change function is activated in response to an input on the viewpoint change button.

In addition, the watching function may be provided with a user interface for quitting watching the battle at any timing convenient to a watcher. For example, the present invention may be configured to provide the watch screen with a watch quit button, so that a watch quit request is transmitted from the player terminal 40 of the watcher to the server 20 on the basis of an input on the watch quit button, and the server 20, in response to the watch quit request, can end the provision of the watching function by terminating the transmission of input information from the players fighting the battle, etc. to the player terminals 40 of the watcher.

In addition, in the case where participants are also granted a watching right, it may be possible to set a fixed number (upper limit number) on the number of watchers registered per battle. In the case where the number of watchers registered in the competition record reaches the fixed number, when the server 20 receives a new watch application request from a player terminal 40, the server 20 can respond with an error to the player terminal 40 of the requester. In addition, the present invention may be configured to disable an input for a watch application request on the player terminal 40 in the case where the number of watchers registered in the competition record reaches the fixed number.

Although the present invention has been described by way of example of a card game as a game that allows players to fight a battle against each other, other types of games may be provided with the watching function of the information processing system 10. The present invention is applicable to any type of games for allowing players to fight a battle against each other, including a fighting game, a sports game, an action game, a battle royale game, a role-playing game, etc. In addition, a battle between players is not limited to a one-to-one battle and may be in the form of a many-to-many battle or a one-to-many battle.

In addition, the present invention may be configured to allow a player who only watches a battle without participating in the battle to be registered as a non-competitor in the competition record of a "user competition" and to relieve a non-competitor from the burden of registering a card deck. Also, the "watch setting" for a "user competition" may be provided with selectable options: "organizer and non-competitors only", which is a watching right for enabling only the organizer and non-competitors to watch the game; "non-competitors only", which is a watching right for enabling only non-competitors to watch the game; etc.

In addition, card information implemented so as not to be disclosed on the in-battle game screen but to be disclosed on the watch screen may be applied to all of the stock pile card, hand card, and field card or to only some of them. Furthermore, in the case where there are a plurality of hand cards, card information concerning only some of the hand cards may be disclosed on the watch screen.

In addition, it may be possible to accept registration of a new player as a participant in a "user competition" even while the "user competition" is being held. Moreover, even after a competition record of a "user competition" has been generated with the organizer being set not to participate in a battle, the server 20 may be capable of changing the content of registration so as to set the organizer as an organizer and participant in response to a request from the player terminal 40 of the organizer.

What is claimed is:

1. A non-transitory computer-readable information storage medium storing a program that is executable by a computer, the program comprising instructions to perform a method comprising:
   generating, in response to a request from a first terminal of a first player serving as an organizer, a battle group in which said first player is registered as the organizer;
   registering, in response to requests from a plurality of terminals of a plurality of players different from the organizer, said plurality of players in the battle group;
   displaying, using a graphical user interface on the first terminal, a competition information setting screen configured to receive a plurality of different inputs from the organizer using an input unit for a plurality of settings of a computer game,
   wherein the plurality of different inputs comprise a first input for changing a watch setting of a second player among the plurality of players for the computer game;
   granting, in response to receiving the first input from the first terminal of the first player serving as the organizer and using a server, a watching right to the second player concerning a battle between the plurality of players belonging to the battle group,
   wherein the watching right enables a watch application on a second terminal among the plurality of terminals to view the computer game;
   executing, using the server, the computer game among the plurality of players in the battle group fighting the battle against each other player among the plurality of players; and
   providing a watching function using the watch application that allows the battle between the plurality of players to be watched by the second player according to the watching right,
   wherein the watch setting is further changed to disable watching of the computer game by the second terminal of the second player and enable watching through the first terminal of the first player registered as the organizer.

2. The non-transitory computer-readable information storage medium according to claim 1,
   wherein information concerning game media used by a third player serving as an opponent is not disclosed at the plurality of terminals of the plurality of players fighting the battle, and
   wherein the watching function provides that the battle between the plurality of players can be watched at the second terminal of the second player having the watching right,
   said second terminal disclosing the information concerning the game media not disclosed to the plurality of players fighting the battle against each other.

3. An information processing device, comprising:
   a computer processor; and
   a memory connected to the computer processor, wherein the memory comprises instructions configured to perform a method comprising:
   generating, in response to a request from a first terminal of a first player serving as an organizer, a battle group in which said first player is registered as the organizer;
   registering, in response to requests from a plurality of terminals of a plurality of players different from the organizer, said plurality of players in the battle group;
   displaying, using a graphical user interface on the first terminal, a competition information setting screen configured to receive a plurality of different inputs from the organizer using an input unit for a plurality of settings of a computer game,
   wherein the plurality of different inputs comprise a first input for changing a watch setting of a second player among the plurality of players for the computer game;
   granting, in response to receiving the first input from the first terminal of the first player serving as the organizer and using a server, a watching right to the second player concerning a battle between the plurality of players belonging to the battle group, wherein the watching right enables a watch application on a second terminal among the plurality of terminals to view the computer game;

executing, using a server, the computer game among the plurality of players in the battle group fighting the battle against each other player among the plurality of players; and providing a watching function using the watch application that allows the battle between the plurality of players to be watched by the second player according to the watching right, wherein the watch setting is further changed to disable watching of the computer game by the second terminal of the second player and enable watching through the first terminal of the first player registered as the organizer.

4. A method comprising:

generating, in response to a request from a first terminal of a first player serving as an organizer, a battle group in which said first player is registered as the organizer;

registering, in response to requests from a plurality of terminals of a plurality of players different from the organizer, said plurality of players in the battle group;

displaying, using a graphical user interface on the first terminal, a competition information setting screen configured to receive a plurality of different inputs from the organizer using an input unit for a plurality of settings of a computer game, wherein the plurality of different inputs comprise a first input for changing a watch setting of a second player among the plurality of players for the computer game;

granting, in response to receiving the first input from the first terminal of the first player serving as the organizer and using a server, a watching right to the second player concerning a battle between the plurality of players belonging to the battle group, wherein the watching right enables a watch application on a second terminal among the plurality of terminals to view the computer game;

executing, using a server, the computer game among the plurality of players in the battle group fighting the battle against each other player among the plurality of players; and providing a watching function using the watch application that allows the battle between the plurality of players to be watched by the second player according to the watching right, wherein the watch setting is further changed to disable watching of the computer game by the second terminal of the second player and enable watching through the first terminal of the first player registered as the organizer.

* * * * *